US012436551B2

(12) United States Patent
Matsumoto et al.

(10) Patent No.: US 12,436,551 B2
(45) Date of Patent: Oct. 7, 2025

(54) POWER-SUPPLY STABILIZATION CIRCUIT

(71) Applicant: Panasonic Intellectual Property Management Co., Ltd., Osaka (JP)

(72) Inventors: Keizo Matsumoto, Okayama (JP); Shinichi Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 157 days.

(21) Appl. No.: 18/563,642

(22) PCT Filed: May 19, 2022

(86) PCT No.: PCT/JP2022/020798

§ 371 (c)(1),
(2) Date: Nov. 22, 2023

(87) PCT Pub. No.: WO2023/002744

PCT Pub. Date: Jan. 26, 2023

(65) Prior Publication Data

US 2024/0288891 A1 Aug. 29, 2024

(30) Foreign Application Priority Data

Jul. 20, 2021 (JP) ................................ 2021-120013

(51) Int. Cl.
*G05F 1/56* (2006.01)
*G05F 1/46* (2006.01)

(52) U.S. Cl.
CPC ................ *G05F 1/56* (2013.01); *G05F 1/468* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 6,791,303 B2 9/2004 Klotz et al.
9,488,999 B2 11/2016 Winich et al.
(Continued)

FOREIGN PATENT DOCUMENTS

JP 01-181211 A 7/1989
JP 05-204476 A 8/1993
(Continued)

OTHER PUBLICATIONS

International Search Report dated Jul. 26, 2022 issued in International Patent Application No. PCT/JP2022/020798, with English translation.

*Primary Examiner* — Sean Kayes
*Assistant Examiner* — Nusrat Quddus
(74) *Attorney, Agent, or Firm* — Rimon P.C.

(57) ABSTRACT

A power-supply stabilization circuit includes: a first transistor disposed in a second path; a second transistor disposed in a third path; a third transistor current mirror-connected to the first transistor; a fourth transistor current mirror-connected to the second transistor; a differential amplifier; and a first low-pass filter connected between a node and a fifth path. The differential amplifier performs inverting amplification on a difference between a reference voltage and a voltage of an added signal obtained by adding a constant-voltage signal outputted from a constant-voltage power supply and an output signal of the first low-pass filter, and outputs a difference signal obtained by the inverting amplification to the first transistor and the second transistor.

9 Claims, 13 Drawing Sheets

(58) Field of Classification Search

CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/463; G05F 1/468; G05F 1/461; G05F 1/465; G05F 1/562; G05F 1/565; G05F 1/567; G05F 1/569; G05F 1/571; G05F 1/573; G05F 1/5735; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H05B 39/048; B23K 11/24; H04B 2215/069

See application file for complete search history.

(56) References Cited

U.S. PATENT DOCUMENTS

| | | | | |
|---|---|---|---|---|
| 2005/0030106 A1* | 2/2005 | Yamamoto | H03F 1/52 | 330/298 |
| 2007/0057657 A1* | 3/2007 | Hashimoto | H02M 3/158 | 323/282 |
| 2010/0295529 A1* | 11/2010 | Consoer | G05F 3/30 | 323/313 |
| 2022/0404421 A1* | 12/2022 | Lim | H02H 3/202 | |

FOREIGN PATENT DOCUMENTS

| | | |
|---|---|---|
| JP | 09-230951 A | 9/1997 |
| WO | 2019/171674 A1 | 9/2019 |

* cited by examiner

POWER-SUPPLY STABILIZATION CIRCUIT

CROSS-REFERENCE OF RELATED APPLICATIONS

This application is the U.S. National Phase under 35 U.S.C. § 371 of International Patent Application No. PCT/JP2022/020798, filed on May 19, 2022, which in turn claims the benefit of Japanese Patent Application No. 2021-120013, filed on Jul. 20, 2021, the entire disclosures of which Applications are incorporated by reference herein.

TECHNICAL FIELD

The present disclosure relates to a power-supply stabilization circuit that stabilizes an output of a constant-voltage power supply.

BACKGROUND ART

Patent Literature (PTL) 1 discloses, for example, a technology for removing ripples included in an output voltage at the secondary coil side of a switching regulator (output voltage of a constant-voltage power supply).

CITATION LIST

Patent Literature

[PTL 1] Japanese Unexamined Patent Application Publication No. 9-230951

SUMMARY OF INVENTION

Technical Problem

However, for reasons of circuit structure, the circuit of the foregoing technology disclosed in PTL 1 is intended for correcting convex portions of the ripples, and not for actively correcting concave portions of the ripples. Thus, the technology of PTL 1 can be improved upon in stabilizing an output of the constant-voltage power supply.

In view of this, the present disclosure provides a power-supply stabilization circuit capable of further stabilizing an output of a constant-voltage power supply.

Solution to Problem

The power-supply stabilization circuit in the present disclosure is a power-supply stabilization circuit that stabilizes a constant-voltage signal outputted from a constant-voltage power supply and including a noise component, and outputs the constant-voltage signal that has been stabilized from an output terminal. The power-supply stabilization circuit includes: a first transistor that is disposed in a second path that connects a first path and a first constant-voltage portion, the first path connecting the constant-voltage power supply and the output terminal, the first constant-voltage portion having a constant voltage at a voltage level lower than a voltage level of a voltage of the constant-voltage signal outputted from the constant-voltage power supply; a first shunt resistor that is connected between the first transistor and the first constant-voltage portion; a second transistor that is disposed in a third path that connects the first path and a second constant-voltage portion having a constant voltage at a voltage level higher than the voltage level of the voltage of the constant-voltage signal outputted from the constant-voltage power supply; a second shunt resistor that is connected between the second transistor and the second constant-voltage portion; a third transistor that is disposed in a fourth path and current mirror-connected to the first transistor, the fourth path connecting the first constant-voltage portion and the second constant-voltage portion and different from the second path and the third path; a fourth transistor that is disposed between the second constant-voltage portion and the third transistor in the fourth path, and current mirror-connected to the second transistor; a differential amplifier that includes a first positive input terminal to which a first reference voltage is inputted and a first negative input terminal which is connected to the first path; and a first low-pass filter that is connected between a fifth path and a node, in the fourth path, that is present between the third transistor and the fourth transistor, the fifth path connecting the first path and the first negative input terminal. Here, an added signal is inputted to the first negative input terminal, the added signal being obtained by adding the constant-voltage signal and an output signal of the first low-pass filter, the differential amplifier performs inverting amplification on a difference between a voltage of the added signal and the first reference voltage, and outputs a first difference signal obtained by the inverting amplification to the first transistor and the second transistor, and the power-supply stabilization circuit performs push-pull operations to cause an electric current that is responsive to the first difference signal to flow into the first constant-voltage portion from the first path via the first transistor and the first shunt resistor, when the voltage of the added signal is higher than the first reference voltage, and cause an electric current that is responsive to the first difference signal to flow into the first path from the second constant-voltage portion via the second shunt resistor and the second transistor, when the voltage of the added signal is lower than the first reference voltage.

The power-supply stabilization circuit in the present disclosure is a power-supply stabilization circuit that stabilizes a constant-voltage signal outputted from a constant-voltage power supply and including a noise component, and outputs the constant-voltage signal that has been stabilized from an output terminal. The power-supply stabilization circuit includes: a first transistor that is disposed in a second path that connects a first path and a first constant-voltage portion, the first path connecting the constant-voltage power supply and the output terminal, the first constant-voltage portion having a constant voltage at a voltage level lower than a voltage level of a voltage of the constant-voltage signal outputted from the constant-voltage power supply; a first shunt resistor that is connected between the first transistor and the first constant-voltage portion; a second transistor that is disposed in a third path that connects the first path and a second constant-voltage portion having a constant voltage at a voltage level higher than the voltage level of the voltage of the constant-voltage signal outputted from the constant-voltage power supply; a second shunt resistor that is connected between the second transistor and the second constant-voltage portion; a first voltage sensing resistor that is disposed in a sixth path that connects the first transistor and the second transistor and is different from the second path and the third path; a second voltage sensing resistor that is disposed in the sixth path, between the second transistor and the first sensing resistor; a differential amplifier that includes a first positive input terminal to which a first reference voltage is inputted and a first negative input terminal which is connected to the first path; and a first low-pass filter that is connected between a fifth path and a node, in the sixth path, that is present between the first voltage sensing resistor and the second voltage sensing resistor, the fifth path connecting the first path and the first negative input terminal. Here, an added signal is inputted to the first negative input terminal, the added signal being obtained by adding the constant-voltage signal and an output signal of the first low-pass filter, the differential amplifier performs inverting amplification on a difference between a voltage of the added signal and the first reference voltage, and outputs a first difference signal obtained by the inverting amplification to the first transistor and the second transistor, and the power-supply stabilization circuit performs push-pull operations to cause an electric current that is responsive to the first difference signal to flow into the first constant-voltage portion from the first path via the first transistor and the first shunt resistor, when the voltage of the added signal is higher than the first reference voltage, and cause an electric current that is responsive to the first difference signal to flow into the first path from the second constant-voltage portion via the second shunt resistor and the second transistor, when the voltage of the added signal is lower than the first reference voltage.

The power-supply stabilization circuit in the present disclosure is a power-supply stabilization circuit that stabilizes a constant-voltage signal outputted from a constant-voltage power supply and including a noise component, and outputs the constant-voltage signal that has been stabilized from an output terminal. The power-supply stabilization circuit includes: a first transistor that is disposed in a second path that connects a first path and a first constant-voltage portion, the first path connecting the constant-voltage power supply and the output terminal, the first constant-voltage portion having a constant voltage at a voltage level lower than a voltage level of a voltage of the constant-voltage signal outputted from the constant-voltage power supply; a first shunt resistor that is connected between the first transistor and the first constant-voltage portion; a second transistor that is disposed in a third path that connects the first path and a second constant-voltage portion having a constant voltage at a voltage level higher than the voltage level of the voltage of the constant-voltage signal outputted from the constant-voltage power supply; a second shunt resistor that is connected between the second transistor and the second constant-voltage portion; a third low-pass filter; a differential amplifier that includes a first positive input terminal to which an output signal of the third low-pas filter is inputted and a first negative input terminal which is connected to the first path; a second reference voltage generator that is disposed in a seventh path and generates a second reference voltage from the voltage of the constant-voltage signal, the seventh path connecting the first path and the first constant-voltage portion and different from the second path; and a DC servo controller that includes a second positive input terminal to which the second reference voltage is inputted and a second negative input terminal. Here, the differential amplifier performs inverting amplification on a difference between the voltage of the constant-voltage signal and an output signal of the third low-pass filter, and outputs a first difference signal obtained by the inverting amplification to the second negative input terminal, the first transistor, and the second transistor, the DC servo controller performs inverting amplification on a difference between the second reference voltage and the first difference signal, and outputs a second difference signal obtained by the inverting amplification to the third low-pass filter, the power-supply stabilization circuit performs push-pull operations to cause an electric current that is responsive to the first difference signal to flow into the first constant-voltage portion from the first path via the first transistor and the first shunt resistor, when the voltage of the first difference signal is higher than the second reference voltage, and cause an electric current that is responsive to the first difference signal to flow into the first path from the second constant-voltage portion via the second shunt resistor and the second transistor, when the voltage of the first difference signal is lower than the second reference voltage.

Advantageous Effects of Invention

The power-supply stabilization circuit of the present disclosure is capable of further stabilizing an output of a constant-voltage power supply.

DESCRIPTION OF EMBODIMENTS

The following describes in detail the embodiments with reference to the drawings where appropriate. Note, however, that more detailed description than is necessary can be omitted. For example, detailed description of a well-known matter or repetitive description of substantially the same configuration can be omitted. This is to prevent the following description from becoming unnecessarily redundant and facilitate the understanding of those skilled in the art.

Also note that the inventors provide the accompanying drawings and the following description for those skilled in the art to fully understand the present disclosure, and thus that these do not intend to limit the subject recited in the claims.

Embodiment 1

With reference to FIG. 1 through FIG. 6, the following describes Embodiment 1 and its variations.

Figure 1:
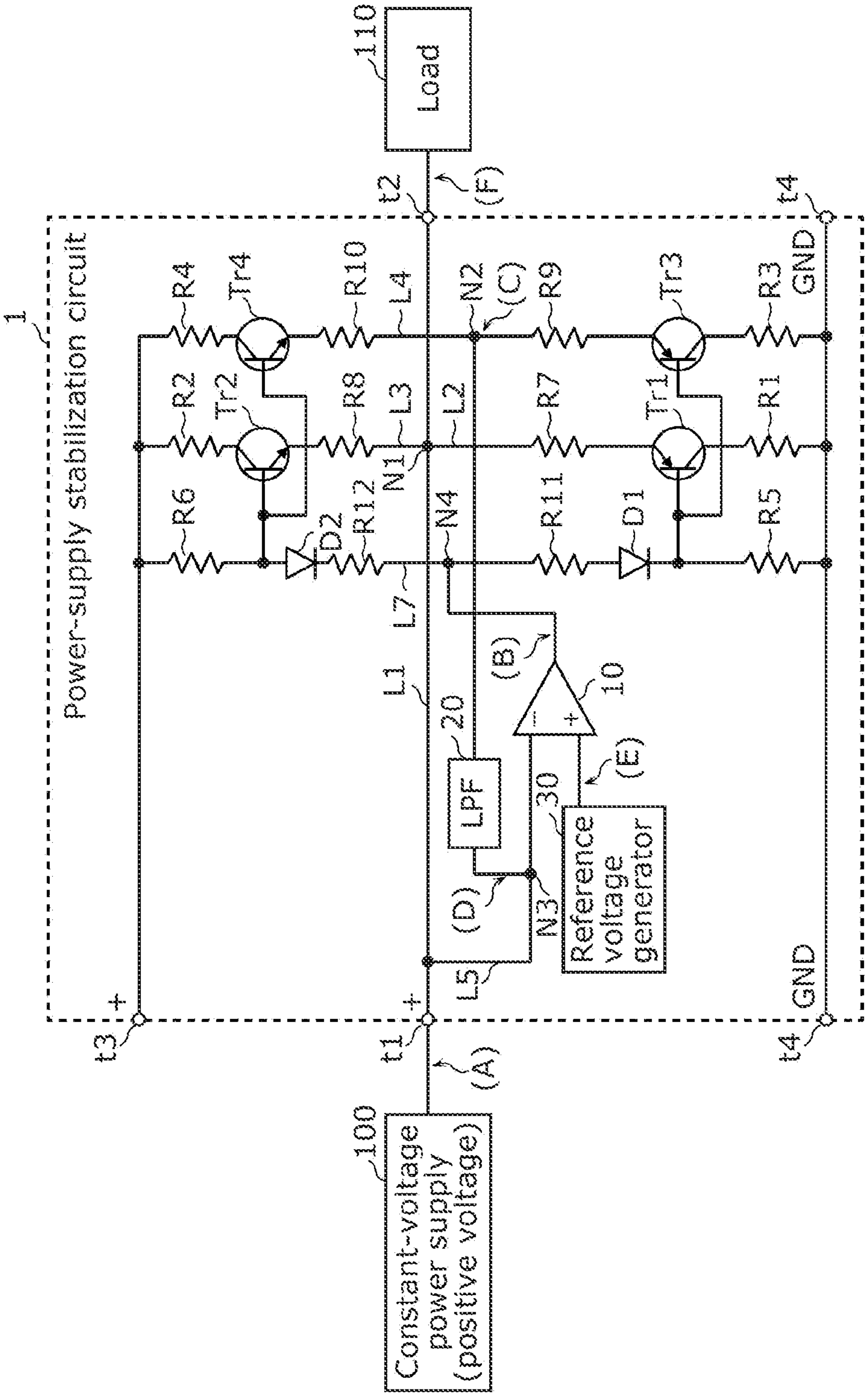
FIG. 1 is a circuit configuration diagram showing an example of a power-supply stabilization circuit according to Embodiment 1.

FIG. 1 is a circuit configuration diagram showing an example of power-supply stabilization circuit 1 according to Embodiment 1. Note that, in addition to power-supply stabilization circuit 1, FIG. 1 also shows: constant-voltage power supply 100 that is connected to input terminal t1 and outputs a signal to be inputted to power-supply stabilization circuit 1; and load 110 that is connected to output terminal t2 that outputs a signal processed by power-supply stabilization circuit 1 (processing of removing noise components including, for example, ripples to be described later).

Constant-voltage power supply 100 is a power supply that generates a constant-voltage signal from an alternating-current power supply and a direct-current power supply, and outputs the generated constant-voltage signal. The constant-voltage signal outputted from constant-voltage power supply 100 includes noise components such as ripples. A ripple is a noise component superimposed on a constant voltage generated by constant-voltage power supply 100. A ripple arises, for example, in response to the switching frequency at the time of generating a constant voltage. The constant-voltage signal also includes various noise components, including surge and spike. Constant-voltage power supply 100 outputs a constant-voltage signal having a positive voltage.

Load 110 is connected to output terminal t2 and supplied with electric power outputted from constant-voltage power supply 100. Load 110 is, for example, a device, etc. for sound reproduction. For better sound quality, therefore, load 110 needs to be supplied with electric power from which noise components such as ripples have been removed.

Power-supply stabilization circuit 1 is a circuit that stabilizes a constant-voltage signal outputted from constant-voltage power supply 100 and including noise components such as ripples, and outputs the stabilized constant-voltage signal from output terminal t2. In the following, a component, in the constant-voltage signal, that includes no noise components such as ripples is also referred to as a direct-current (DC) component. The constant-voltage signal outputted from constant-voltage power supply 100 is a signal on which noise components such as ripples are superimposed on the DC component. Power-supply stabilization circuit 1 includes differential amplifier 10, low-pass filter (LPF) 20, reference voltage generator 30, transistors Tr1, Tr2, Tr3, and Tr4, resistors R1, R2, R3, R4, R5, R6, R7, R8, R9, R10, R11, and R12, and diodes D1 and D2.

Transistor Tr1 is disposed in in path L2 that connects terminals t4 and path L1 that connects constant-voltage power supply 100 (more specifically, input terminal t1) and output terminal t2. Transistor Tr1 is an example of the first transistor. Path L1 is an example of the first path, and path L2 is an example of the second path. Each of terminals t4 is an example of the first constant-voltage portion having a constant voltage at a voltage level lower than that of the voltage of the constant-voltage signal outputted from constant-voltage power supply 100. Here, the voltage of the constant-voltage signal is a positive voltage. In this case, the voltage level of terminals t4 is the ground level. For example, terminals t4 are connected to the ground. Here, two terminals t4 are shown, but there may be a single or three or more terminals t4. Transistor Tr1 is, for example, a PNP bipolar transistor. The emitter of transistor Tr1 is connected to path L1 via resistor R7.

Resistor R7 is an emitter resistor of transistor Tr1. Transistor Tr1 and resistor R7 are connected in series in path L2. The emitter of transistor Tr1 is connected to one end of resistor R7, and path L1 is connected to the other end of resistor R7.

Resistor R1 is connected between transistor Tr1 and terminals t4 in path L2. Resistor R1 is an example of the first shunt resistor. The resistance value of resistor R1 is set in accordance with the magnitude of noise components such as ripples that can be included in the constant-voltage signal. Transistor Tr1 and resistor R1 are connected in series in path L2. The collector of transistor Tr1 is connected to one end of resistor R1, and terminals t4 are connected to the other end of resistor R1.

Transistor Tr2 is disposed in path L3 that connects path L1 and terminal t3. Transistor Tr2 is an example of the second transistor. Path L3 is an example of the third path. Terminal t3 is an example of the second constant-voltage portion having a constant voltage at a voltage level higher than that of the voltage of the constant-voltage signal outputted from constant-voltage power supply 100. For example, terminal t3 is connected to a voltage-boosting circuit that boosts the voltage of the constant-voltage signal outputted from the constant-voltage power supply and outputs the resulting signal. Transistor Tr2 is, for example, an NPN bipolar transistor. The emitter of transistor Tr2 is connected to path L1 via resistor R8.

Resistor R8 is an emitter resistor of transistor Tr2. Transistor Tr2 and resistor R8 are connected in series in path L3. The emitter of transistor Tr2 is connected to one end of resistor R8, and path L1 is connected to the other end of resistor R8.

Resistor R2 is connected between transistor Tr2 and terminal t3 in path L3. Resistor R2 is an example of the second shunt resistor. The resistance value of resistor R2 is set in accordance with the magnitude of noise components such as ripples that can be included in the constant-voltage signal. Transistor Tr2 and resistor R2 are connected in series in path L3. The collector of transistor Tr2 is connected to one end of resistor R2, and terminal t3 is connected to the other end of resistor R2.

Transistor Tr3 is disposed in path L4, and current mirror-connected to transistor Tr1. That two transistors are current mirror-connected means that these two transistors are connected to form a current mirror circuit. Transistor Tr3 is an example of the third transistor. Path L4 is an example of the fourth path that connects terminal t3 and terminals t4, and is different from path L2 and path L3. Different from path L2 and path L3, path L4 is not connected to path L1. Transistor Tr3 is, for example, a PNP bipolar transistor. The base of transistor Tr1 and the base of transistor Tr3 are connected, thereby enabling transistor Tr1 and transistor Tr3 to be current mirror-connected.

Resistor R3 is a shunt resistor that is connected between transistor Tr3 and terminals t4. The resistance value of resistor R3 is set in accordance with an electric current that flows through transistor Tr3. For example, the resistance value of resistor R3 is set to a high value to decrease an electric current that flows through transistor Tr3 to decrease the amount of electric current to be consumed. The collector of transistor Tr3 is connected to one end of resistor R3, and terminals t4 are connected to the other end of resistor R3.

Transistor Tr4 is disposed between terminal t3 and transistor Tr3 in path L4, and current mirror-connected to transistor Tr2. Transistor Tr4 is an example of the fourth transistor. Transistor Tr4 is, for example, an NPN bipolar transistor. The base of transistor Tr2 and the base of transistor Tr4 are connected, thereby enabling transistor Tr2 and transistor Tr4 to be current mirror-connected. The emitter of transistor Tr3 and the emitter of transistor Tr4 are connected via resistors R9 and R10.

Resistor R4 is a shunt resistor that is connected between transistor Tr4 and terminal t3. The resistance value of resistor R4 is set in accordance with an electric current that flows through transistor Tr4. For example, the resistance value of resistor R4 is set to a high value to decrease an electric current that flows through transistor Tr4 to decrease the amount of electric current to be consumed. The collector of transistor Tr4 is connected to one end of resistor R4, and terminal t3 is connected to the other end of resistor R4.

Resistor R9 is an emitter resistor of transistor Tr3. Resistor R10 is an emitter resistor of transistor Tr4. Transistor Tr3, transistor Tr4, resistor R9, and resistor R10 are connected in series in path L4. The emitter of transistor Tr3 is connected to one end of resistor R9, the emitter of transistor Tr4 is connected to one end of resistor R10, and the other end of resistor R9 and the other end of resistor R10 are connected. The resistance values of resistor R9 and resistor R10 are set to high values as with resistors R3 and R4 at the collector side.

Differential amplifier 10 is a differential amplification circuit that includes a positive input terminal (+) and a negative input terminal (−). An example of differential amplifier 10 is the operational amplifier. A first reference voltage is inputted to the positive input terminal. The negative input terminal is connected to path L1. The positive input terminal of differential amplifier 10 is an example of the first positive input terminal, and the negative input terminal of differential amplifier 10 is an example of the first negative input terminal.

Reference voltage generator 30 generates the first reference voltage. Reference voltage generator 30 is an example of the first reference voltage generator. Reference voltage generator 30 is connected to the positive input terminal of differential amplifier 10. The generated first reference voltage is inputted to the positive input terminal. Reference voltage generator 30 is configured as, for example, a Zener diode, an LPF, etc. Since constant-voltage power supply 100 outputs a constant-voltage signal having a positive voltage, the first reference voltage generated by reference voltage generator 30 is also set to the same positive voltage as that of constant-voltage power supply 100.

LPF 20 is an example of the first low-pass filter that is connected between node N2, which is present between resistor R9 and resistor R10 in path L4, and path L5 (more specifically, node N3 in path L5), which connects path L1 and the negative input terminal of differential amplifier 10. LPF 20 is configured as, for example, an RC filter that includes a resistor and a capacitor. The passband of LPF 20 is lower than the frequencies of noise components such as ripples. Note that LPF 20 is not limited to be configured as an RC filter, etc., and thus is not limited to having a specific configuration so long as LPF 20 is an LPF.

An added signal obtained by adding an output signal of LPF 20 and the constant-voltage signal outputted from constant-voltage power supply 100 and including noise components such as ripples is inputted to the negative input terminal of differential amplifier 10. Although not illustrated, a resistor is provided between LPF 20 and node N3. Such resistor adds the constant-voltage signal and the output signal of LPF 20.

Diode D1 is disposed in path L7 that connects terminal t3 and terminals t4, and is different from paths L2, L3, and L4. The cathode of diode D1 is connected to the base of transistor Tr1. Note that different from paths L2 and L3, path L7 is not connected to path L1. The voltage drop of diode D1 in the forward direction is, for example, 0.6 V to 0.7 V.

Resistor R5 is a shunt resistor that is connected between diode D1 and terminals t4 in path L7. The resistance value of resistor R5 is set in accordance with an electric current that flows through diode D1. For example, the resistance value of resistor R5 is set to a high value to decrease an electric current that flows through diode D1 to decrease the amount of electric current to be consumed. The cathode of diode D1 is connected to one end of resistor R5, and terminals t4 are connected to the other end of resistor R5. The anode side of diode D1 is connected to the output of differential amplifier 10 via resistor R11 that sets an idling current of transistor Tr1.

Diode D2 is disposed in path L7, and the anode of diode D2 is connected to the base of transistor Tr2. The anode of diode D1 and the cathode of diode D2 are connected via resistors R11 and R12. The voltage drop of diode D2 in the forward direction is, for example, 0.6 V to 0.7 V. Diode D1 and diode D2 are connected in series in path L7.

For example, transistors Tr1 and Tr3, and diode D1 are thermal-bonded. Transistors Tr1 and Tr3, and diode D1 are thermal-bonded by, for example, diode-connecting diode D1 for connecting the base and the collector, using the same transistor as transistor Tr1, and then integrating transistors Tr1 and Tr3, and diode D1 into a single package. Similarly, transistors Tr2 and Tr4, and diode D2 are thermal-bonded. Transistors Tr2 and Tr4, and diode D2 are thermal-bonded by, for example, diode-connecting diode D2 for connecting the base and the collector, using the same transistor as transistor Tr2, and then integrating transistors Tr2 and Tr4, and diode D2 into a single package.

Resistor R6 is a shunt resistor that is connected between diode D2 and terminal t3 in path L7. The resistance value of resistor R6 is set in accordance with an electric current that flows through diode D2. For example, the resistance value of resistor R6 is set to a high value to decrease an electric current that flows through diode D2 to decrease the amount of electric current to be consumed. The anode of diode D2 is connected to one end of resistor R6, and terminal t3 is connected to the other end of resistor R6. The cathode side of diode D2 is connected to the output of differential amplifier 10 via resistor R12 that sets an idling current of transistor Tr2.

Differential amplifier 10 performs inverting amplification on the difference between the voltage of the added signal and the first reference voltage, and outputs a first difference signal obtained by the inverting amplification to transistors Tr1 to Tr2. More specifically, differential amplifier 10 outputs the first difference signal to the base of transistor Tr1 and the base of transistor Tr2. Even more specifically, the output terminal of differential amplifier 10 is connected to node N4 that is present between resistor R11 and resistor R12 in path L7. Differential amplifier 10 outputs the first difference signal to the base of transistor Tr1 via diode D1, and to the base of transistor Tr2 via diode D2. This enables a signal to be inputted to the base of transistor Tr1 that is a signal smaller than the first difference signal by an amount of the voltage drop of diode D1 in the forward direction (i.e., 0.6 V to 0.7 V). This also enables a signal to be inputted to the base of transistor Tr2 that is a signal greater than the first difference signal by an amount of the voltage drop of diode D2 in the forward direction (i.e., 0.6 V to 0.7 V).

Power-supply stabilization circuit 1 performs push-pull operations to cause an electric current that is responsive to the first difference signal to flow into terminals t4 from path L1 via resistor R7, transistor Tr1 and resistor R1, when the voltage of the added signal is higher than the first reference voltage, and cause an electric current that is responsive to the first difference signal to flow into path L1 from terminal t3 via resistor R2, transistor Tr2 and resistor R8, when the voltage of the added signal is lower than the first reference voltage. The push-pull operations will be explained with reference to FIG. 3A and FIG. 3B to be described later.

In power-supply stabilization circuit 1, as described later with reference to FIG. 3A and FIG. 3B, transistors Tr1 and Tr2 perform constant voltage control by performing push-pull operations for absorbing and supplying an electric current. When this is done, the voltage at the control point (i.e., node N1 between resistor R7 and resistor R8) of current mode operation cannot be subjected to negative feedback to differential amplifier 10 as it is. More specifically, since the voltage at node N1 is a constant voltage due to a low output impedance of constant-voltage power supply 100, it is impossible to perform sensing of varying voltage at node N1. In view of this, by providing transistors Tr3 and Tr4 that are current mirror-connected to transistors Tr1 and Tr2, it is possible to perform an operation of converting an electric current into a voltage. This enables the voltage at node N2 that is present between resistor R9 and resistor R10 to be subjected to negative feedback to the negative input terminal of differential amplifier 10 via LPF 20, instead of the voltage at node N1.

With reference to FIG. 2A through FIG. 2F, the following describes the waveforms of signals at the points indicated by (A) through (F) in FIG. 1.

Figure 2A:
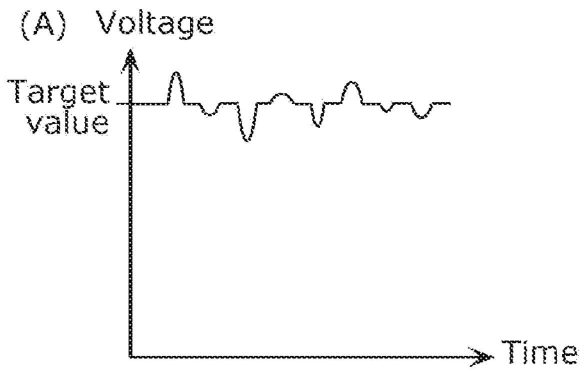
FIG. 2A is a diagram showing a waveform of a constant-voltage signal that includes noise components such as ripples.

FIG. 2A is a diagram showing a waveform of a constant-voltage signal that includes noise components such as ripples. FIG. 2A shows the waveform of the signal at the point indicated by (A) in FIG. 1.

Figure 2B:
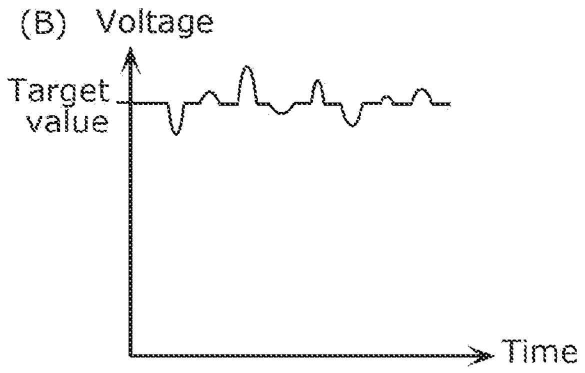
FIG. 2B is a diagram showing a waveform of an output signal of a differential amplifier.

FIG. 2B is a diagram showing a waveform of an output signal (first difference signal) of differential amplifier 10. FIG. 2B shows the waveform of the signal at the point indicated by (B) in FIG. 1.

Figure 2C:
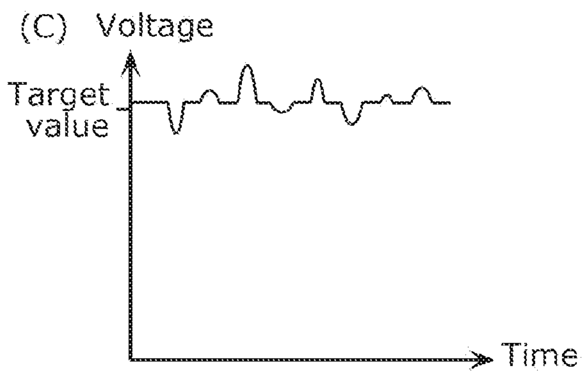
FIG. 2C is a diagram showing a waveform of a voltage signal that has been sensed.

FIG. 2C is a diagram showing a waveform of a voltage signal that has been sensed. FIG. 2C shows the waveform of the signal at the point indicated by (C) in FIG. 1.

Figure 2D:
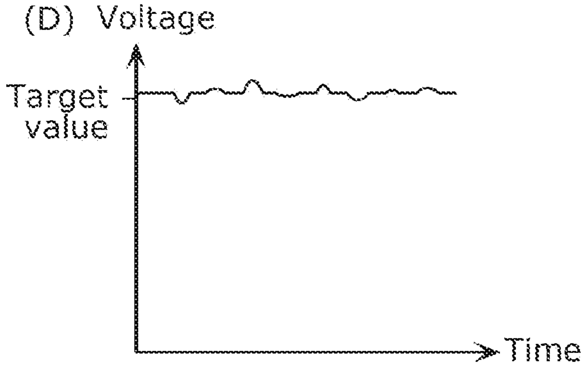
FIG. 2D is a diagram showing a waveform of an output signal of a first low-pass filter.

FIG. 2D is a diagram showing a waveform of an output signal of LFP 20. FIG. 2D shows the waveform of the signal at the point indicated by (D) in FIG. 1.

Figure 2E:
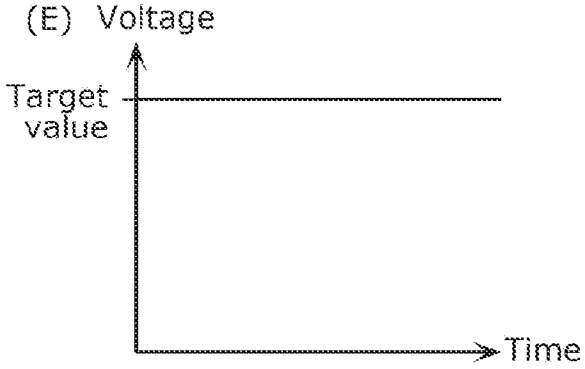
FIG. 2E is a diagram showing a waveform of a reference voltage signal.

FIG. 2E is a diagram showing a waveform of a reference voltage signal. FIG. 2E shows the waveform of the signal at the point indicated by (E) in FIG. 1.

Figure 2F:
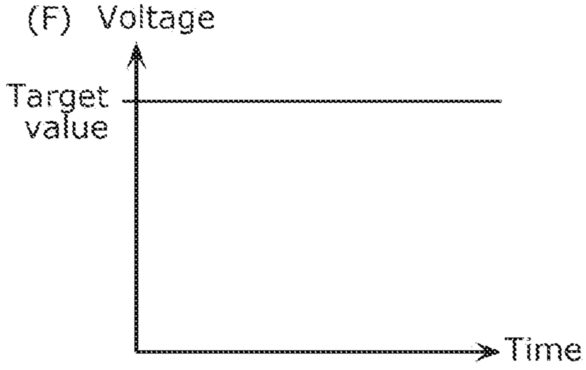
FIG. 2F is a diagram showing a waveform of the constant-voltage signal from which the noise components such as ripples have been removed.

FIG. 2F is a diagram showing a waveform of the constant-voltage signal from which the noise components such as ripples have been removed. FIG. 2F shows the waveform of the signal at the point indicated by (F) in FIG. 1.

As shown in FIG. 2A, noise components such as concave and convex ripples are superimposed on the DC component of the constant-voltage signal. As shown in FIG. 2C, the varying voltage is being sensed as a result of converting an electric current into a voltage by transistors Tr3 and Tr4 that are current mirror-connected to transistors Tr1 and Tr2. Note that since the noise components such as ripples are also subjected to sensing, it is known from FIG. 2D that the noise components such as ripples are smoothened to a certain degree by LPF 20. FIG. 2B shows the first difference signal that is obtained by the inverting amplification performed by differential amplifier 10 on the difference between the voltage of the added signal, which is obtained by adding the output signal of LPF 20 shown in FIG. 2D and the constant-voltage signal including the noise components such as ripples shown in FIG. 2A, and the first reference voltage of the reference voltage signal shown in FIG. 2E. It is known from FIG. 2B that the first difference signal is a signal obtained by inverting the constant-voltage signal that includes the noise components such as ripples shown in FIG. 2A. Power-supply stabilization circuit 1 performs push-pull operations in accordance with such first difference signal, thereby removing the noise components such as ripples from the constant-voltage signal as shown in FIG. 2F. Here, the push-pull operations are described in detail with reference to FIG. 3A and FIG. 3B.

Figure 3A:
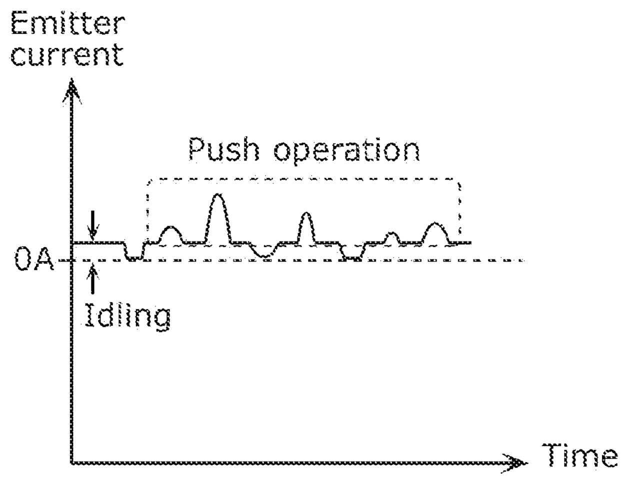
FIG. 3A is a diagram showing a waveform of an emitter current when a second transistor is performing a push operation.

FIG. 3A is a diagram showing a waveform of an emitter current when transistor Tr2 is performing a push operation.

Figure 3B:
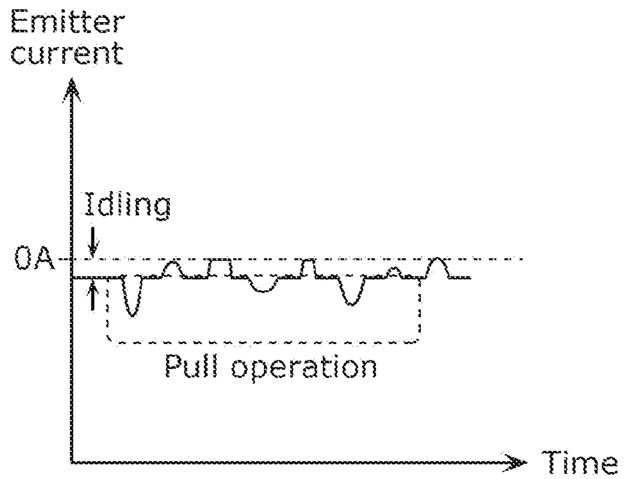
FIG. 3B is a diagram showing a waveform of an emitter current when a first transistor is performing a pull operation.

FIG. 3B is a diagram showing a waveform of an emitter current when transistor Tr1 is performing a pull operation.

When the voltage of the added signal is lower than the first reference voltage (stated differently, at the timing at which a noise component such as a concave ripple is included in the constant-voltage signal), the first difference signal is smaller than the target value as shown in FIG. 2B. For this reason, the first difference signal added with an amount of voltage equivalent to the voltage drop of diode D2 in the forward direction causes transistor Tr2 that is an NPN bipolar transistor to turn ON. An emitter current of transistor Tr2 in ON state is an electric current responsive to the magnitude of the first difference signal. As such, the magnitude of a convex portion of the first difference signal corresponds to the magnitude of a concave portion of noise components such as ripples, as shown in FIG. 2A and FIG. 2B. With this, as indicated by the portion enclosed by "Push operation" in FIG. 3A, by supplying an electric current to correct the concave portions of the noise components such as ripples, using the emitter current of transistor Tr2 that is responsive to the first difference signal, the constant-voltage signal can be brought close to a certain target value as shown in FIG. 2F. In actuality, a certain idling current flows through transistor Tr2 even in the absence of signal. As such, a pull operation is also performed partially within the range of the idling current as shown in FIG. 3A.

When the voltage of the added signal is higher than the first reference voltage (stated differently, at the timing at which a noise component such as a convex ripple is included in the constant-voltage signal), the first difference signal is smaller than the target value as shown in FIG. 2B. For this reason, the first difference signal that is obtained by subtracting an amount of voltage equivalent to the voltage drop of diode D1 in the forward direction causes transistor Tr1 that is a PNP bipolar transistor to turn ON. An emitter current of transistor Tr1 in ON state is an electric current responsive to the magnitude of the first difference signal. As such, the magnitude of a concave portion of the first difference signal corresponds to the magnitude of a convex portion of noise components such as ripples, as shown in FIG. 2A and FIG. 2B. With this, as indicated by the portion enclosed by "Pull operation" in FIG. 3B, by absorbing an electric current to remove the convex portions of the noise components such as ripples, using the emitter current of transistor Tr1 that is responsive to the first difference signal, the constant-voltage signal can be brought close to a certain target value as shown in FIG. 2F. Similarly, a certain idling current flows through transistor Tr1 even in the absence of signal. As such, a push operation is also performed partially within the range of the idling current as shown in FIG. 3B.

As described above, not only the convex portions of the noise components such as ripples are absorbed and removed, but also the concave portions of the noise components such as ripples are corrected by supplying a signal thereto. It is thus possible to further stabilize the output of constant-voltage power supply 100.

Note that an example has been described in Embodiment 1 in which power-supply stabilization circuit 1 includes reference voltage generator 30, but reference voltage generator 30 may not be provided. This will be described as Variation 1 of Embodiment 1 with reference to FIG. 4.

Figure 4:
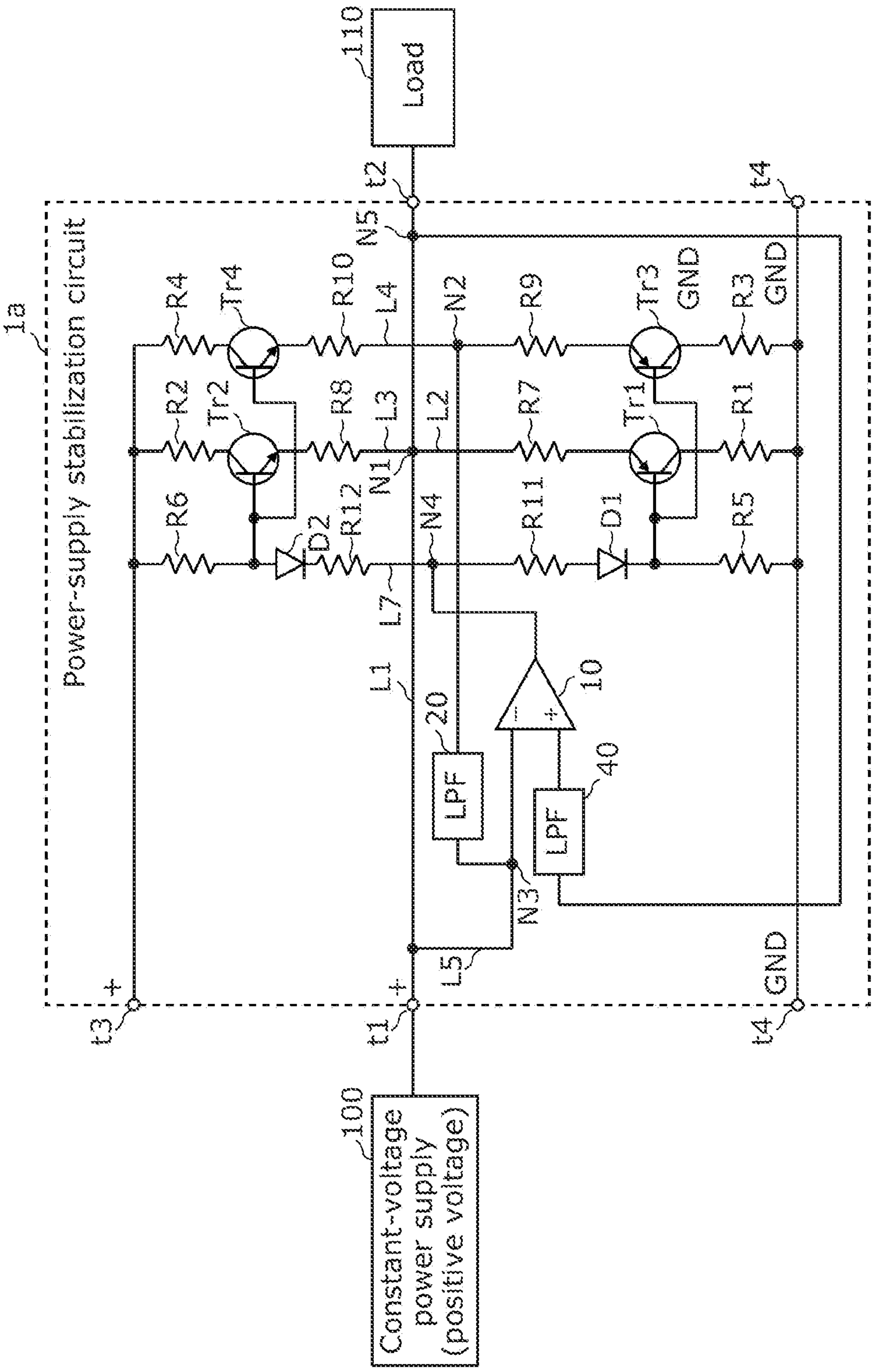
FIG. 4 is a circuit configuration diagram showing an example of a power-supply stabilization circuit according to Variation 1 of Embodiment 1.

FIG. 4 is a circuit configuration diagram showing an example of power-supply stabilization circuit 1*a* according to Variation 1 of Embodiment 1.

Power-supply stabilization circuit 1*a* according to Variation 1 of Embodiment 1 is different from power-supply stabilization circuit 1 according to Embodiment 1 in that LPF 40 connected to path L1 is provided instead of reference voltage generator 30. The other points are the same as those of Embodiment 1, and thus will not be described.

LPF 40 is a second low-pass filter that is disposed in a path that connects path L1 (more specifically, node N5 in path L1) and the positive input terminal of differential amplifier 10. LPF 40 is configured as, for example, an RC filter that includes a resistor and a capacitor. The passband of LPF 40 is lower than the frequencies of noise components such as ripples. Note that LPF 40 is not limited to be configured as an RC filter, etc., and thus is not limited to having a specific configuration so long as LPF 40 is an LPF. In Variation 1 of Embodiment 1, the first reference voltage is the voltage of an output signal of LPF 40. As described above, an output voltage of LPF 40 that is connected to path L1 may be used as the first reference voltage instead of an output voltage of reference voltage generator 30.

Also, a noise component extractor may be provided that extracts noise components such as ripples included in the constant-voltage signal outputted from constant-voltage power supply 100. This will be described as Variation 2 of Embodiment 1 with reference to FIG. 5.

Figure 5:
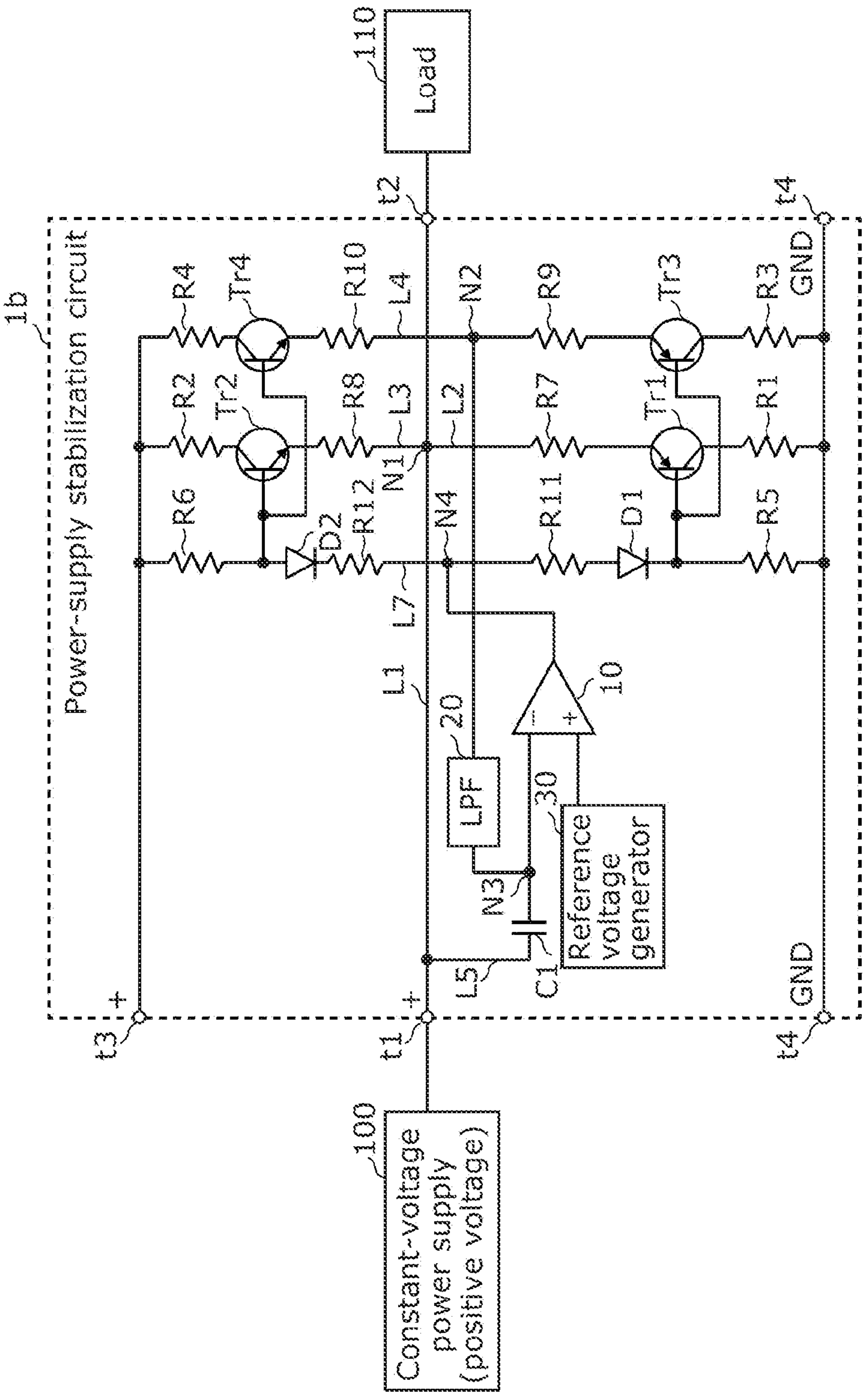
FIG. 5 is a circuit configuration diagram showing an example of a power-supply stabilization circuit according to Variation 2 of Embodiment 1.

FIG. 5 is a circuit configuration diagram showing an example of power-supply stabilization circuit 1*b* according to Variation 2 of Embodiment 1.

Power-supply stabilization circuit 1*b* according to Variation 2 of Embodiment 1 is different from power-supply stabilization circuit 1 according to Embodiment 1 in that capacitor C1 is provided. The other points are the same as those of Embodiment 1, and thus will not be described.

Capacitor C1 is disposed between path L1 and node N3 in path L5 to which LPF 20 is connected. Capacitor C1 is an example of the noise component extractor. Capacitor C1 blocks the DC component from flowing from constant-voltage power supply 100 into the negative input terminal of differential amplifier 10, and extracts the noise component and inputs it to the negative input terminal of differential amplifier 10. Note that the noise component extractor is not limited to a capacitor so long as the noise component extractor is configured to extract noise components.

Note that the noise component extractor may be provided in Variation 1 of Embodiment 1.

Also, an example has been described in Embodiment 1 in which constant-voltage power supply 100 that outputs a constant-voltage signal having a positive voltage is connected to input terminal t1, but a constant-voltage power supply that outputs a constant-voltage signal having a negative voltage may be connected to input terminal t1. This will be described as Variation 3 of Embodiment 1 with reference to FIG. 6.

Figure 6:
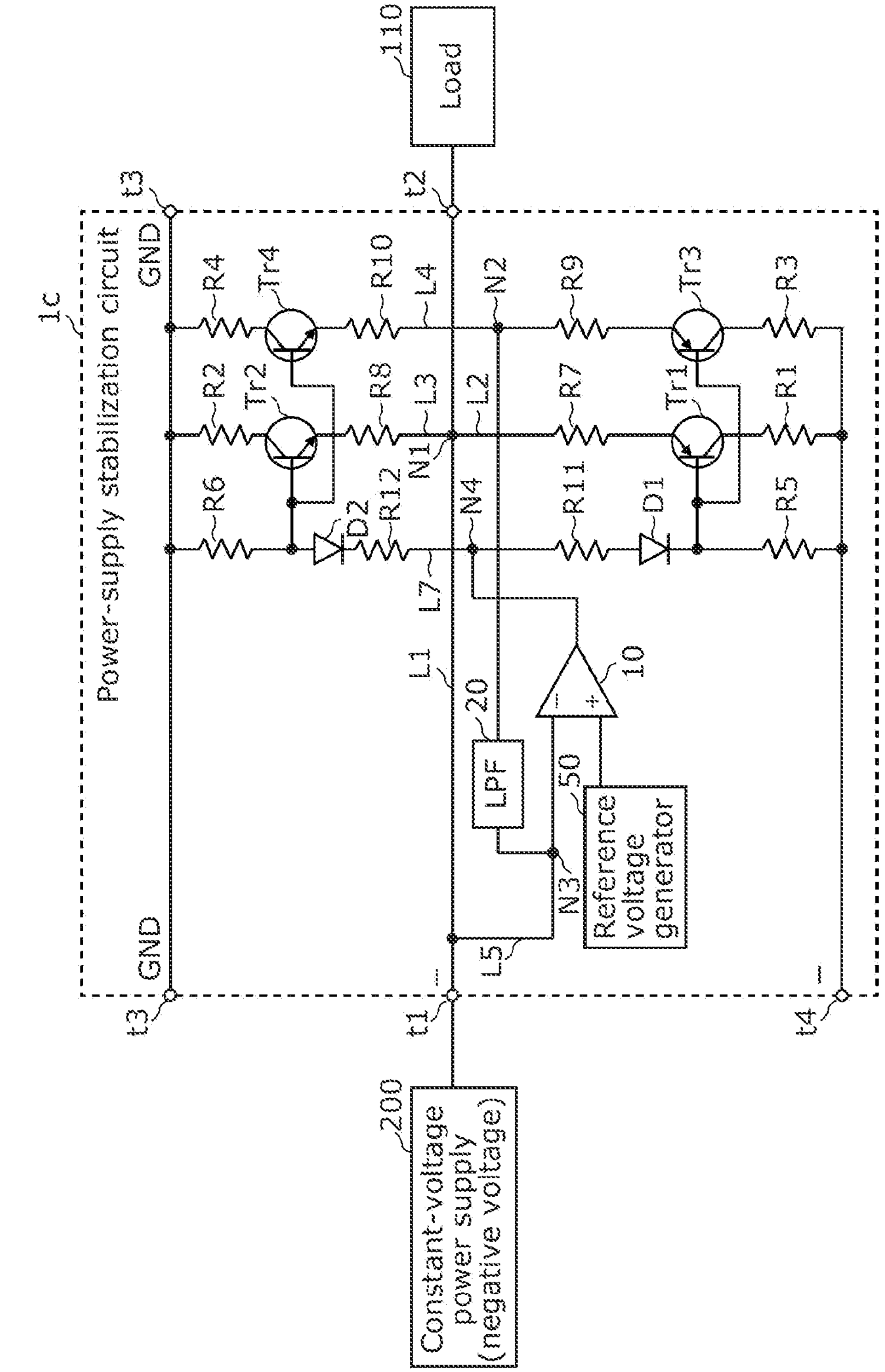
FIG. 6 is a circuit configuration diagram showing an example of a power-supply stabilization circuit according to Variation 3 of Embodiment 1.

FIG. 6 is a circuit configuration diagram showing an example of power-supply stabilization circuit 1*c* according to Variation 3 of Embodiment 1.

Power-supply stabilization circuit 1*c* according to Variation 3 of Embodiment 1 is different from power-supply stabilization circuit 1 according to Embodiment 1 in that: constant-voltage power supply 200 is connected to input terminal t1 instead of constant-voltage power supply 100; reference voltage generator 50 is provided instead of reference voltage generator 30; and as a result of which the functions of terminals t3 and t4 are different from those in Embodiment 1. The other points are the same as those of Embodiment 1, and thus will not be described.

Constant-voltage power supply 200 is a power supply that generates a constant-voltage signal from an alternating-current power supply and a direct-current power supply, and outputs the generated constant-voltage signal. The constant-voltage signal outputted from constant-voltage power supply 200 includes noise components such as ripples. A ripple is a noise component superimposed on a constant voltage generated by constant-voltage power supply 200. A ripple arises, for example, in response to the switching frequency at the time of generating the constant voltage. Constant-voltage power supply 200 outputs a constant-voltage signal having a negative voltage.

Reference voltage generator 50 generates a first reference voltage. Reference voltage generator 50 is an example of the first reference voltage generator. Reference voltage generator 50 is connected to the positive input terminal of differential amplifier 10. The generated first reference voltage is inputted to the positive input terminal. Reference voltage generator 50 is configured as, for example, a Zener diode, an LPF, etc. Since constant-voltage power supply 200 outputs a constant-voltage signal having a negative voltage, the first reference voltage generated by reference voltage generator 50 is also set to the same negative voltage as that of constant-voltage power supply 200.

Each of terminals t3 is an example of the second constant-voltage portion having a constant voltage at a voltage level higher than the voltage of the constant-voltage signal outputted from constant-voltage power supply 200. Here, the voltage of the constant-voltage signal is a negative voltage. In this case, the voltage level of terminals t3 is the ground level. For example, terminals t3 are connected to the ground. Here, two terminals t3 are shown, but there may be a single or three or more terminals t3.

Terminal t4 is an example of the first constant-voltage portion having a constant voltage at a voltage level lower than the voltage of the constant-voltage signal outputted from constant-voltage power supply 200. For example, terminal t4 is connected to a voltage step-down circuit that steps down the voltage of the constant-voltage signal outputted from constant-voltage power supply 200 and outputs the resulting signal.

As described above, even in the case where constant-voltage power supply 200 that outputs a constant-voltage signal having a negative voltage is connected to input terminal t1 of power-supply stabilization circuit 1*c*, it is possible to stabilize an output of constant-voltage power supply 200 as in the case of constant-voltage power supply 100 that outputs a constant-voltage signal having a positive voltage.

Note that, in Variation 3 of Embodiment 1, an output voltage of LPF 40 that is connected to path L1 may be used as the first reference voltage, instead of an output voltage of reference voltage generator 50, and the noise component extractor may be provided.

As described above, power-supply stabilization circuit 1, 1*a*, 1*b*, 1*c* is a circuit that stabilizes a constant-voltage signal outputted from constant-voltage power supply 100, 200 and including a noise component, and outputs the constant-voltage signal that has been stabilized from output terminal t2. Power-supply stabilization circuit 1, 1*a*, 1*b*, 1*c* includes: transistor Tr1 that is disposed in path L2 that connects path L1 and terminal t4, path L1 connecting constant-voltage power supply 100, 200 and output terminal t2, terminal t4 having a constant voltage at a voltage level lower than a voltage level of a voltage of the constant-voltage signal outputted from constant-voltage power supply 100, 200; resistor R1 that is connected between transistor Tr1 and terminal t4; transistor Tr2 that is disposed in path L3 that connects path L1 and terminal t3 having a constant voltage at a voltage level higher than the voltage level of the voltage of the constant-voltage signal outputted from constant-voltage power supply 100, 200; resistor R2 that is connected between transistor Tr2 and terminal t3; transistor Tr3 that is disposed in path L4 and current mirror-connected to transistor Tr1, path L4 connecting terminal t3 and terminal t4 and different from path L2 and path L3; transistor Tr4 that is disposed between terminal t3 and transistor Tr3 in path L4, and current mirror-connected to transistor Tr2; differential amplifier 10 that includes a positive input terminal to which a first reference voltage is inputted and a negative input terminal which is connected to path L1; and LPF 20 that is connected between path L5 and node N2, in path L4, that is present between transistor Tr3 and transistor Tr4 (more specifically, between resistor R9 and resistor R10), path L5 connecting path L1 and the negative input terminal of differential amplifier 10. An added signal is inputted to the negative input terminal of differential amplifier 10, the added signal being obtained by adding the constant-voltage signal and an output signal of LPF 20. Differential amplifier 10 performs inverting amplification on a difference between a voltage of the added signal and the first reference voltage, and outputs a first difference signal obtained by the inverting amplification to transistor Tr1 and transistor Tr2. Power-supply stabilization circuit 1, 1*a*, 1*b*, 1*c* performs push-pull operations to cause an electric current that is responsive to the first difference signal to flow into terminal t4 from path L1 via transistor Tr1 and resistor R1, when the voltage of the added signal is higher than the first reference voltage, and cause an electric current that is responsive to the first difference signal to flow into path L1 from terminal t3 via resistor R2 and transistor Tr2, when the voltage of the added signal is lower than the first reference voltage.

With this, a pull operation is performed to absorb a noise component such as a convex ripple from the constant-voltage signal, when the voltage of the added signal is higher than the first reference voltage, that is, at the timing at which the constant-voltage signal includes a noise component such as a convex ripple. Meanwhile, a push operation is performed to supply a signal to a concave portion of the noise components such as ripples, when the voltage of the added signal is lower than the first reference voltage, that is, at the timing at which the constant-voltage signal includes a noise component such as a concave ripple. Since convex and concave portions of the noise components such as ripples are smoothened in the above manner, it is possible to further stabilize an output of the constant-voltage power supply. However, constant voltage control is performed in this circuit by performing operations for absorbing and supplying an electric current. As such, the voltage at the control point of current mode operation cannot be subjected to negative feedback to differential amplifier 10 as it is. In view of this, by providing transistors Tr3 and Tr4 that are current mirror-connected to transistors Tr1 and Tr2, it is possible to perform an operation of converting an electric current into a voltage. This enables the voltage at node N2 to be subjected to negative feedback to the negative input terminal of differential amplifier 10 via LPF 20, instead of the voltage at the foregoing control point.

For example, power-supply stabilization circuit 1, 1*b*, 1*c* may further include reference voltage generator 30 that generates the first reference voltage.

With this, it is possible for reference voltage generator 30 to generate a more stable and accurate first reference voltage.

For example, power-supply stabilization circuit 1*a* may further include LFP 40 that is disposed in a path that connects path L1 and the positive input terminal of differential amplifier 10. Here, the first reference voltage may be a voltage of an output signal of LPF 40.

With this, the constant-voltage signal that flows through path L1 is smoothened by LFP 40, and the resulting signal is used as the first reference voltage. This eliminates the necessity of reference voltage generator 30, thereby achieving the downsizing of power-supply stabilization circuit 1*a*.

For example, power-supply stabilization circuit 1*b* may further include a noise component extractor that is disposed between path L1 and node N3, in path L5, to which LPF20 is connected.

Depending on usage, control of the direct-current region is not necessary. In such a case, the noise component extractor (e.g., capacitor C1) controls only the alternating-current region to block a direct current. This improves the accuracy of the operating point of direct current.

For example, the voltage of the constant-voltage signal may be a positive voltage, and the voltage level of terminal t4 may be a ground level. Alternatively, the voltage of the constant-voltage signal may be a negative voltage, and the voltage level of terminal t3 may be a ground level.

As described above, power-supply stabilization circuit 1, 1*a*, 1*b* stabilizes an output of constant-voltage power supply 100 that outputs a positive voltage. Also, power-supply stabilization circuit 1*c* stabilizes an output of constant-voltage power supply 200 that outputs a negative voltage.

Embodiment 2

Figure 7:
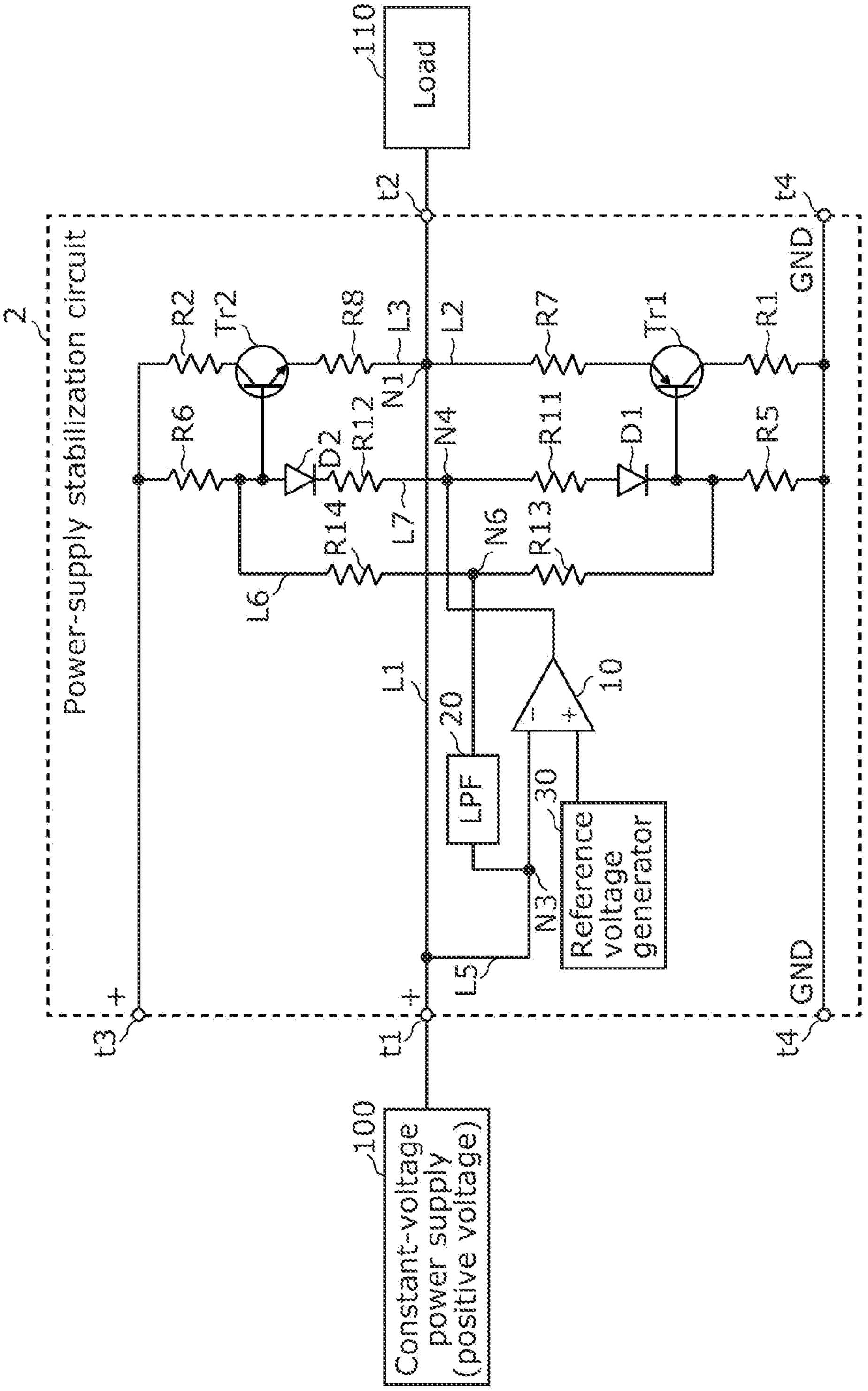
FIG. 7 is a circuit configuration diagram showing an example of a power-supply stabilization circuit according to Embodiment 2.

The following describes Embodiment 2 with reference to FIG. 7.

FIG. 7 is a circuit configuration diagram showing an example of power-supply stabilization circuit 2 according to Embodiment 2.

Power-supply stabilization circuit 2 according to Embodiment 2 is different from power-supply stabilization circuit 1 according to Embodiment 1 in that resistors R13 and R14 are provided instead of transistors Tr3 and Tr4. The other points are the same as those of Embodiment 1, and thus will not be described.

Resistor R13 is disposed in path L6 that connects transistor Tr1 and transistor Tr2 (more specifically, the base of transistor Tr1 and the base of transistor Tr2). Resistor R13 is an example of the first voltage sensing resistor. Path L6 is an example of the sixth path that is different from path L2 and path L3. Note that, different from path L2 and path L3, path L6 is not connected to path L1. One end of resistor R13 is connected to the base of transistor Tr1, the cathode of diode D1, and one end of resistor R5.

Resistor R14 is disposed between transistor Tr2 and resentence R13 in path L6. Resistor R14 is an example of the second voltage sensing resistor. One end of resistor R14 is connected to the base of transistor Tr2, the anode of diode D2, and one end of resistor R6. Resistor R13 and resistor R14 are connected in series in path L6.

In Embodiment 2, LPF 20 is connected between node N6 that is present between resistor R13 and resistor R14 in path L6 and path L5 (more specifically, node N3 in path L5).

In power-supply stabilization circuit 2, as described with reference to FIG. 3A and FIG. 3B, transistors Tr1 and Tr2 perform constant voltage control by performing push-pull operations for absorbing and supplying an electric current. When this is done, the voltage at the control point (i.e., node N1 between resistor R7 and resistor R8) of current mode operation cannot be subjected to negative feedback to differential amplifier 10 as it is. More specifically, since the voltage at node N1 is a constant voltage due to a low output impedance of constant-voltage power supply 100, it is impossible to perform sensing of varying voltage at node N1. In view of this, by providing resistors R13 and R14 that are connected to transistors Tr1 and Tr2, it is possible to perform an operation of converting an electric current into a voltage. This enables the voltage at node N6 between resistor R13 and resistor R14 to be subjected to negative feedback to differential amplifier 10 via LPF 20, instead of the voltage at node N1. Stated differently, resistors R13 and R14 can also implement the function of converting an electric current into a voltage that is a function implemented by transistors Tr3 and Tr4 in Embodiment 1. Note that the use of resistors R13 and R14 instead of transistors Tr3 and Tr4 also enables power-supply stabilization circuit 2 to perform push-pull operations in the same manner as that in Embodiment 1, thus stabilizing an output of constant-voltage power supply 100.

Note that an example has been described in Embodiment 2 in which power-supply stabilization circuit 2 includes reference voltage generator 30, but reference voltage generator 30 may not be included. This will be described as Variation 1 of Embodiment 2 with reference to FIG. 8.

Figure 8:
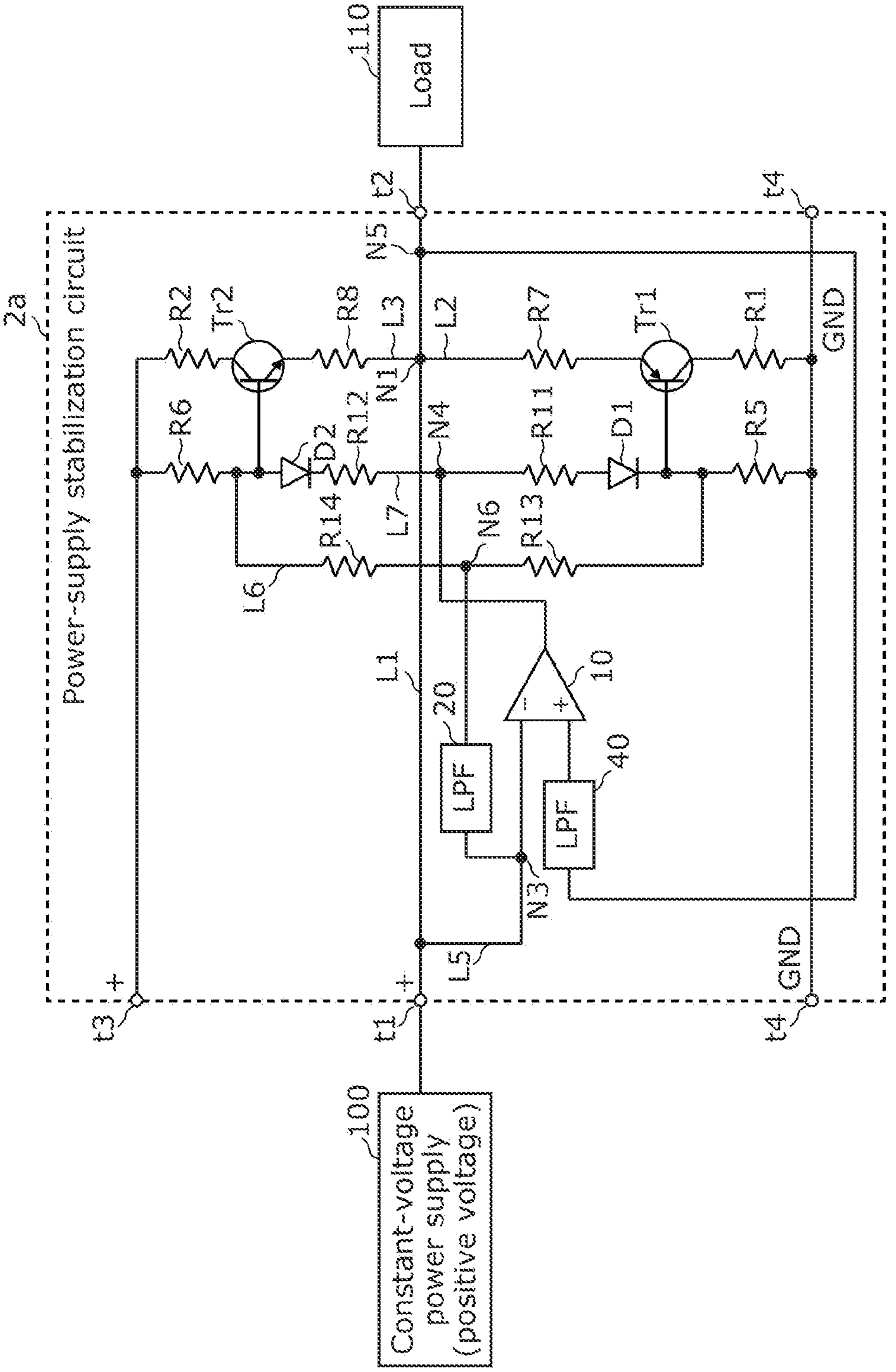
FIG. 8 is a circuit configuration diagram showing an example of a power-supply stabilization circuit according to Variation 1 of Embodiment 2.

FIG. 8 is a circuit configuration diagram showing an example of power-supply stabilization circuit 2*a* according to Variation 1 of Embodiment 2.

Power-supply stabilization circuit 2*a* according to Variation 1 of Embodiment 2 is different from power-supply stabilization circuit 2 according to Embodiment 2 in that LPF 40 connected to path L1 is provided instead of reference voltage generator 30. The other points are the same as those of Embodiment 2, and thus will not be described.

LPF 40 is a second low-pass filter that is disposed in a path that connects path L1 (more specifically, node N5 in path L1) and the positive input terminal of differential amplifier 10. LPF 40 is configured as, for example, an RC filter that includes a resistor and a capacitor. The passband of LPF 40 is lower than the frequencies of noise components such as ripples. Note that LPF 40 is not limited to be configured as an RC filter, etc., and thus is not limited to having a specific configuration so long as LPF 40 is an LPF. In Variation 1 of Embodiment 2, the first reference voltage is the voltage of an output signal of LPF 40. In this manner, an output voltage of LPF 40 that is connected to path L1 may be used as the first reference voltage, instead of an output voltage of reference voltage generator 30.

Also, the noise component extractor may be provided that extracts noise components such as ripples included in a constant-voltage signal outputted from constant-voltage power supply 100. This will be described as Variation 2 of Embodiment 2 with reference to FIG. 9.

Figure 9:
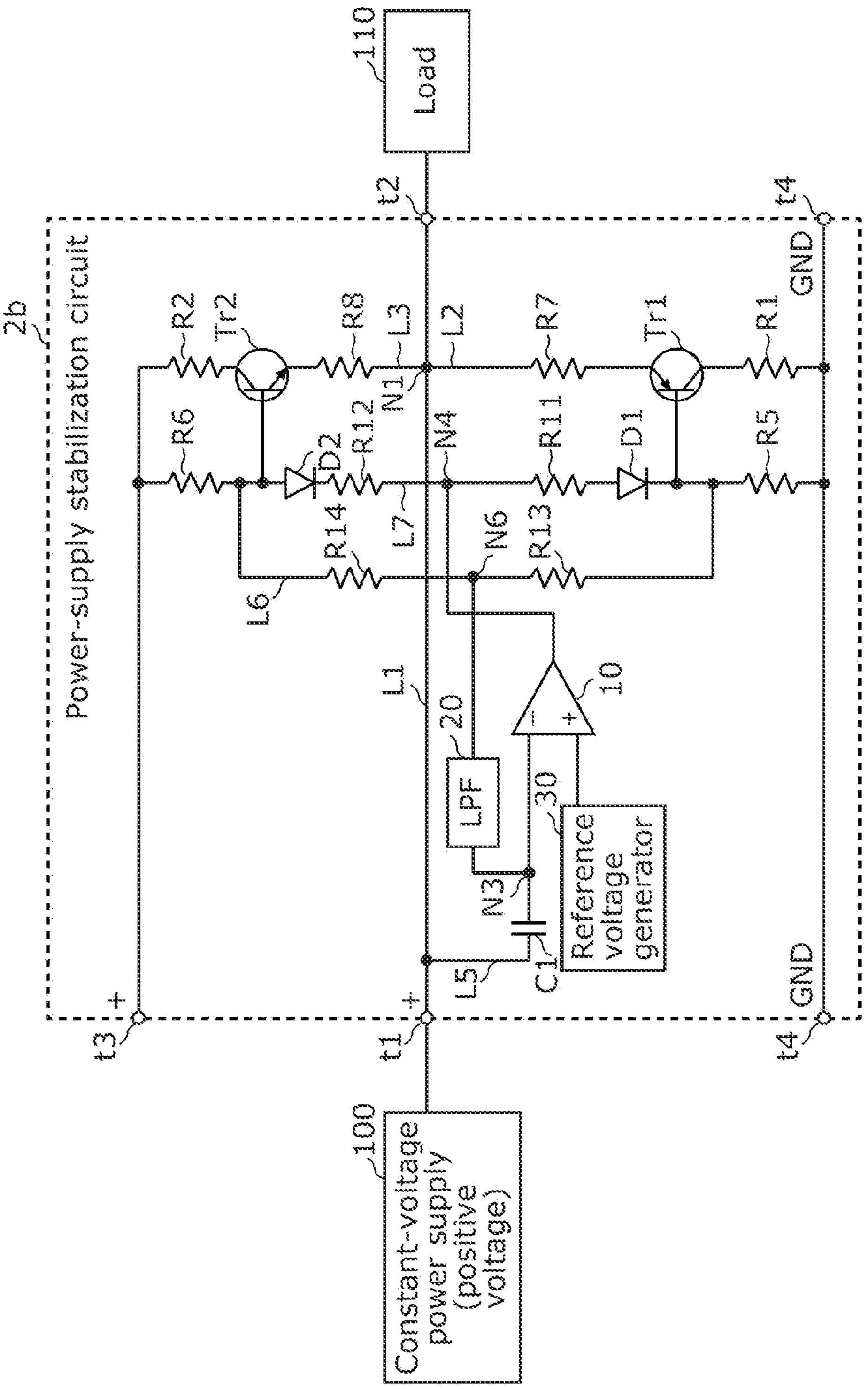
FIG. 9 is a circuit configuration diagram showing an example of a power-supply stabilization circuit according to Variation 2 of Embodiment 2.

FIG. 9 is a circuit configuration diagram showing an example of power-supply stabilization circuit 2*b* according to Variation 2 of Embodiment 2.

Power-supply stabilization circuit 2*b* according to Variation 2 of Embodiment 2 is different from power-supply stabilization circuit 2 according to Embodiment 2 in that capacitor C1 is provided. The other points are the same as those of Embodiment 2, and thus will not be described.

Capacitor C1 is disposed between path L1 and node N3 in path L5 to which LPF 20 is connected. Capacitor C1 is an example of the noise component extractor. Capacitor C1 blocks the DC component from flowing from constant-voltage power supply 100 into the negative input terminal of differential amplifier 10, and extracts the noise component and inputs it to the negative input terminal of differential amplifier 10. Note that the noise component extractor is not limited to a capacitor so long as the noise component extractor is configured to extract noise components.

Note that the noise component extractor may be provided in Variation 1 of Embodiment 2.

Also, an example has been described in Embodiment 2 in which constant-voltage power supply 100 that outputs a constant-voltage signal having a positive voltage is connected to input terminal t1, but a constant-voltage power supply that outputs a constant-voltage signal having a negative voltage may be connected to input terminal t1. This will be described as Variation 3 of Embodiment 2 with reference to FIG. 10.

Figure 10:
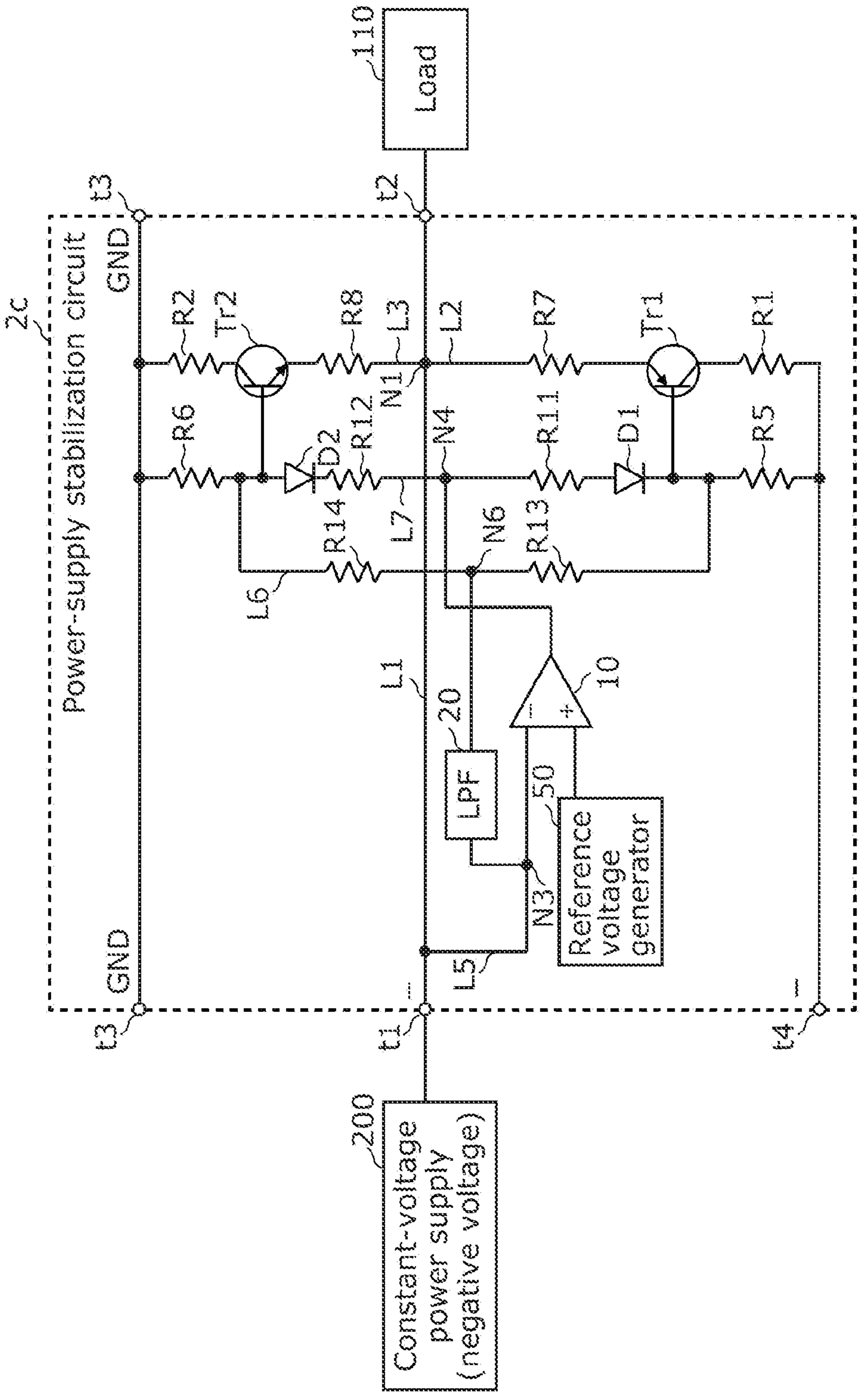
FIG. 10 is a circuit configuration diagram showing an example of a power-supply stabilization circuit according to Variation 3 of Embodiment 2.

FIG. 10 is a circuit configuration diagram showing an example of power-supply stabilization circuit 2*c* according to Variation 3 of Embodiment 2.

Power-supply stabilization circuit 2*c* according to Variation 3 of Embodiment 2 is different from power-supply stabilization circuit 2 according to Embodiment 2 in that: constant-voltage power supply 200 is connected to input terminal t1 instead of constant-voltage power supply 100; reference voltage generator 50 is provided instead of reference voltage generator 30; and as a result of which the functions of terminals t3 and t4 are different from those in Embodiment 2. The other points are the same as those of Embodiment 2, and thus will not be described.

Constant-voltage power supply 200 is a power supply that generates a constant-voltage signal from an alternating-current power supply and a direct-current power supply, and outputs the generated constant-voltage signal. The constant-voltage signal outputted from constant-voltage power supply 200 includes noise components such as ripples. A ripple is a noise component superimposed on a constant voltage generated by constant-voltage power supply 200. A ripple arises, for example, in response to the switching frequency at the time of generating the constant voltage. Constant-voltage power supply 200 outputs a constant-voltage signal having a negative voltage.

Reference voltage generator 50 generates the first reference voltage. Reference voltage generator 50 is connected to the positive input terminal of differential amplifier 10. The generated first reference voltage is inputted to the positive input terminal. Reference voltage generator 50 is configured as, for example, a Zener diode, an LPF, etc. Since constant-voltage power supply 200 outputs a constant-voltage signal having a negative voltage, the first reference voltage generated by reference voltage generator 50 is also set to the same negative voltage as that of constant-voltage power supply 200.

Each of terminals t3 is an example of the second constant-voltage portion having a constant voltage at a voltage level higher than the voltage of the constant-voltage signal outputted from constant-voltage power supply 200. Here, the voltage of the constant-voltage signal is a negative voltage. In this case, the voltage level of terminals t3 is the ground level. For example, terminals t3 are connected to the ground. Here, two terminals t3 are shown, but there may be a single or three or more terminals t3.

Terminal t4 is an example of the first constant-voltage portion having a constant voltage at a voltage level lower than the voltage of the constant-voltage signal outputted from constant-voltage power supply 200. For example, terminal t4 is connected to a voltage step-down circuit that steps down the voltage of the constant-voltage signal outputted from the constant-voltage power supply and outputs the resulting signal.

As described above, even in the case where constant-voltage power supply 200 that outputs a constant-voltage signal having a negative voltage is connected to input terminal t1 of power-supply stabilization circuit 2*c*, it is possible to stabilize an output of constant-voltage power supply 200 as in the case of constant-voltage power supply 100 that outputs a constant-voltage signal having a positive voltage.

Note that, in Variation 3 of Embodiment 2, an output voltage of LPF 40 that is connected to path L1 may be used as the first reference voltage instead of an output voltage of reference voltage generator 50, and the noise component extractor may be provided.

As described above, power-supply stabilization circuit 2 is a power-supply stabilization circuit that stabilizes a constant-voltage signal outputted from constant-voltage power supply 100 and including a noise component, and outputs the constant-voltage signal that has been stabilized from output terminal t2. Power-supply stabilization circuit 2 includes: transistor Tr1 that is disposed in path L2 that connects path L1 and terminal t4, path L1 connecting constant-voltage power supply 100 and output terminal t2, terminal t4 having a constant voltage at a voltage level lower than a voltage level of a voltage of the constant-voltage signal outputted from constant-voltage power supply 100; resistor R1 that is connected between transistor Tr1 and terminal t4; transistor Tr2 that is disposed in path L3 that connects path L1 and terminal t3 having a constant voltage at a voltage level higher than the voltage level of the voltage of the constant-voltage signal outputted from constant-voltage power supply 100; resistor R2 that is connected between transistor Tr2 and terminal t3; resistor R13 that is disposed in path L6 that connects transistor Tr1 and transistor Tr2 and is different from path L2 and path L3; resistor R14 that is disposed between transistor Tr2 and resistor R13 in path L6; differential amplifier 10 that includes a positive input terminal to which a first reference voltage is inputted and a negative input terminal which is connected to path L1; and LPF 20 that is connected between path L5 and node N6, in path L6, that is present between resistor R13 and resistor R14, path L5 connecting path L1 and the negative input terminal of differential amplifier 10. Here, an added signal is inputted to the negative input terminal of differential amplifier 10, the added signal being obtained by adding the constant-voltage signal and an output signal of LPF 20. Differential amplifier 10 performs inverting amplification on a difference between a voltage of the added signal and the first reference voltage, and outputs a first difference signal obtained by the inverting amplification to transistor Tr1 and transistor Tr2. Power-supply stabilization circuit 100 performs push-pull operations to cause an electric current that is responsive to the first difference signal to flow into terminal t4 from path L1 via transistor Tr1 and resistor R1, when the voltage of the added signal is higher than the first reference voltage, and cause an electric current that is responsive to the first difference signal to flow into path L1 from terminal t3 via resistor R2 and transistor Tr2, when the voltage of the added signal is lower than the first reference voltage.

With this, it is possible to further stabilize an output of constant-voltage power supplies 100 and 200 in Embodiment 2 and its variations, as with Embodiment 1 and its variations. It is also possible to feedback the voltage at node N6 between resistor R13 and resistor R14 to differential amplifier 10 via LPF 20.

Also, the use of resistors R13 and R14 instead of transistors Tr3 and Tr4 reduces the number of transistors that need to be thermal-boded. More specifically, in Embodiment 1 and its variations, transistors Tr1 and Tr3, and diode D1 need to be thermal-bonded. In Embodiment 2 and its variations, however, only transistor Tr1 and diode D1 need to be thermal-bonded. Similarly, in Embodiment 1 and its variations, transistors Tr2 and Tr4, and diode D2 need to be thermal-bonded. In Embodiment 2 and its variations, however, only transistor Tr2 and diode D2 need to be thermal-bonded.

Embodiment 3

Figure 11:
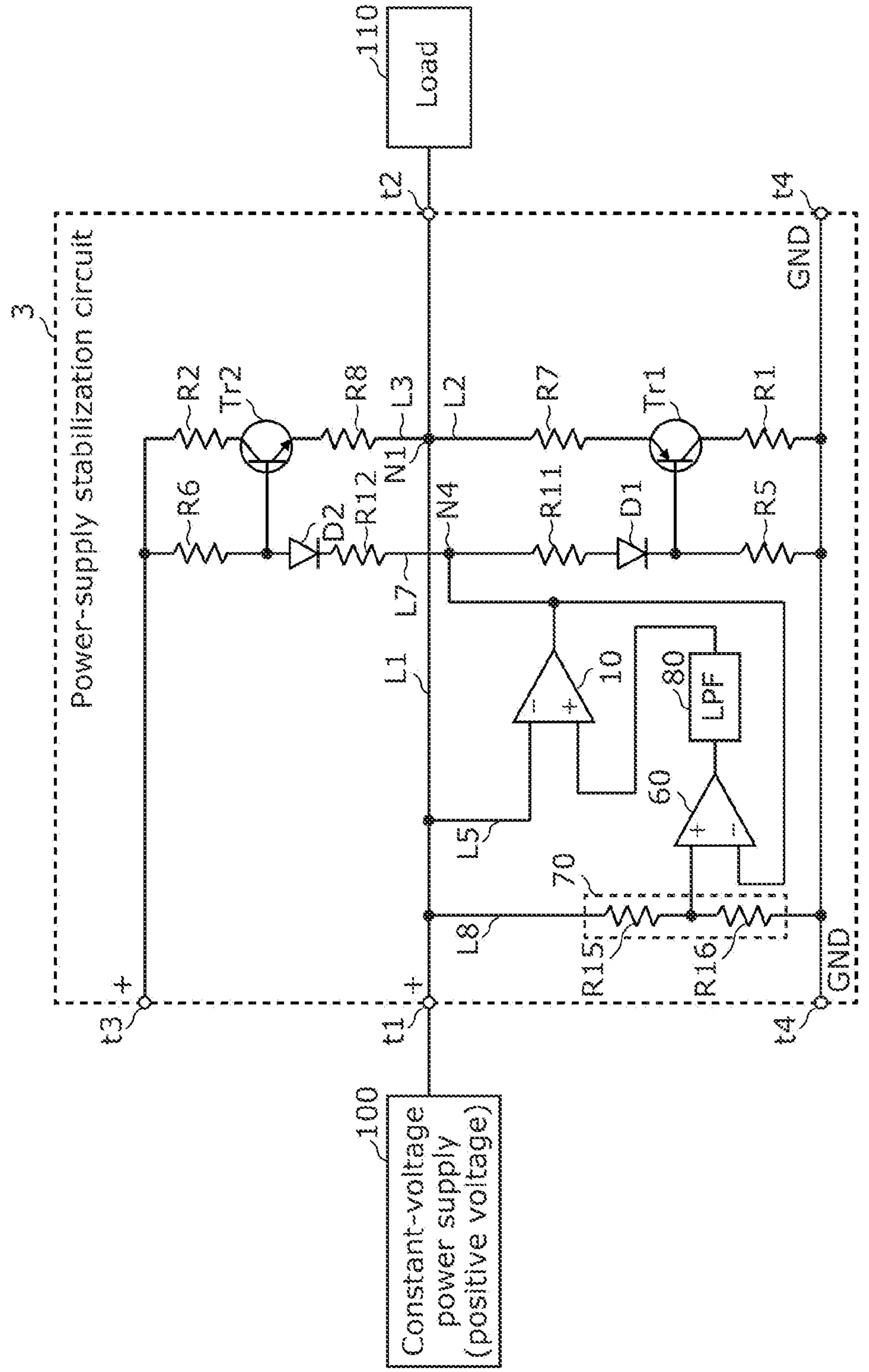
FIG. 11 is a circuit configuration diagram showing an example of a power-supply stabilization circuit according to Embodiment 3.

The following describes Embodiment 3 with reference to FIG. 11.

FIG. 11 is a circuit configuration diagram showing an example of power-supply stabilization circuit 3 according to Embodiment 3.

Power-supply stabilization circuit 3 according to Embodiment 3 is different from power-supply stabilization circuit 1 according to Embodiment 1 in that DC servo controller 60, reference voltage generator 70, and LPF 80 are provided instead of transistors Tr3 and Tr4. The following mainly describes the differences from Embodiment 1.

An output signal of LPF 80 is inputted to the positive input terminal of differential amplifier 10. The negative input terminal of differential amplifier 10 is connected to path L1.

LPF 80 is configured as, for example, an RC filter that includes a resistor and a capacitor. The passband of LPF 80 is lower than the frequencies of noise components such as ripples. LPF 80 is an example of the third low-pass filter. Note that LPF 80 is not limited to be configured as an RC filter, etc., and thus is not limited to having a specific configuration so long as LPF 80 is an LPF.

Reference voltage generator 70 is disposed in path L8 that connects path L1 and terminal t4 and is different from path L2. Reference voltage generator 70 generates a second reference voltage from the voltage of a constant-voltage signal of constant-voltage power supply 100. Reference voltage generator 70 is an example of the second reference voltage generator. Path L8 is an example of the seventh path.

Reference voltage generator 70 is, for example, a voltage-dividing circuit that divides the voltage of the constant-voltage signal of constant-voltage power supply 100 to generate the second reference voltage. Reference voltage generator 70 includes, for example, resistors R15 and R16. Resistors R15 and R16 are disposed in series in path L8. Reference voltage generator 70 divides the voltage of constant-voltage signal in accordance with the ratio of the resistance values of resistors R15 and R16, and outputs the resulting voltage. The resistance value of R15 is, for example, a small value such as a one-hundredth value of the resistance value of resistor R16. For example, reference voltage generator 70 outputs the second reference voltage that is on the order of −0.1 voltage with respect to the voltage of the constant-voltage signal of constant-voltage power supply 100. With this, it is possible to make a minor adjustment of an output of differential amplifier 10. For example, it is possible to make a minor adjustment of an electric current that flows through transistor Tr2 (e.g., it is possible to increase the electric current to a degree).

Note that the second reference voltage outputted from reference voltage generator 70 may be the same voltage as that of the constant-voltage signal of constant-voltage power supply 100. In this case, reference voltage generator 70 may not include resistor R15, out of resistors R15 and R16.

DC servo controller 60 is a differential amplification circuit that includes a positive input terminal (+) to which the second reference voltage is inputted and a negative input terminal (−). An example of DC servo controller 60 is an operational amplifier. The positive input terminal of DC servo controller 60 is an example of the second positive input terminal, and the negative input terminal of DC servo controller 60 is an example of the second negative input terminal.

Differential amplifier 10 performs inverting amplification on the difference between the voltage of the constant-voltage signal of constant-voltage power supply 100 and the output signal of LPF 80, and outputs a first difference signal obtained by the inverting amplification to the negative input terminal of DC servo controller 60, and transistor Tr1 and transistor Tr2.

DC servo controller 60 performs inverting amplification on the difference between the second reference voltage and the first difference signal, and outputs a second difference signal obtained by the inverting amplification to LPF 80.

Power-supply stabilization circuit 3 performs push-pull operations to cause an electric current that is responsive to the first difference signal to flow into terminals t4 from path L1 via transistor Tr1 and resistor R1, when the voltage of the first difference signal is higher than the second reference voltage, and cause an electric current that is responsive to the first difference signal to flow into path L1 from terminal t3 via resistor R2 and transistor Tr2, when the voltage of the first difference signal is lower than the second reference voltage. A pull operation to be performed when the voltage of the first difference signal is higher than the second reference voltage is basically the same as a pull operation to be performed in Embodiment 1 or Embodiment 2 when the voltage of the added signal is higher than the first reference voltage, and thus will not be described here. A push operation to be performed when the voltage of the first difference signal is lower than the second reference voltage is basically the same as a push operation to be performed in Embodiment 1 or Embodiment 2 when the voltage of the added signal is lower than the first reference voltage, and thus will not be described here.

In power-supply stabilization circuit 3, as described with reference to FIG. 3A and FIG. 3B, transistors Tr1 and Tr2 perform constant voltage control by performing push-pull operations for absorbing and supplying an electric current. When this is done, the voltage at the control point (i.e., node N1 between resistor R7 and resistor R8) of current mode operation cannot be subjected to negative feedback to differential amplifier 10 as it is. More specifically, since the voltage at node N1 is a constant voltage due to a low output impedance of constant-voltage power supply 100, it is impossible to perform sensing of varying voltage at node N1. In view of this, the constant-voltage signal that includes noise components such as ripples is inputted to the negative input terminal of differential amplifier 10 to extract the noise components. Also, DC servo controller 60 performs inverting amplification on the difference between the voltage of the first difference signal outputted from differential amplifier 10 and the second reference voltage generated from the constant-voltage signal to perform DC servo control on an output signal (first difference signal) of differential amplifier 10. Then, the signal smoothened by LPF 80 is inputted to the positive input terminal of differential amplifier 10. This eliminates the necessity to adjust the reference voltage for differential amplifier 10, thereby enabling differential amplifier 10 to operate in a manner that the reference voltage for differential amplifier 10 follows variations in the constant-voltage signal. At the same time, this can also compensate for DC offsets of differential amplifier 10.

Note that resistors R13 and R14 may be provided in Embodiment 3 as in the case of Embodiment 2. This will be described as a variation of Embodiment 3 with reference to FIG. 12.

Figure 12:
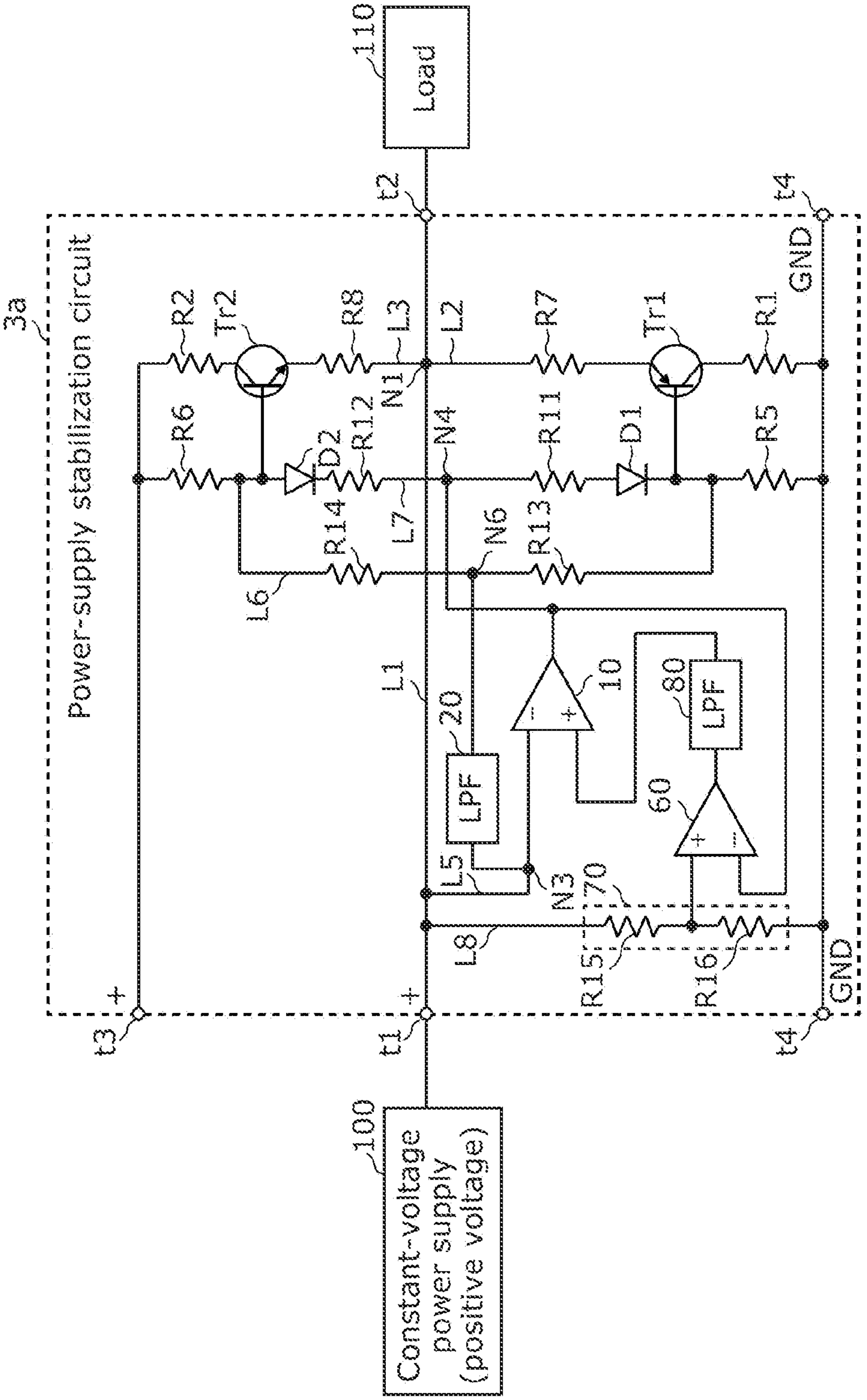
FIG. 12 is a circuit configuration diagram showing an example of a power-supply stabilization circuit according to a variation of Embodiment 3.

FIG. 12 is a circuit configuration diagram showing an example of power-supply stabilization circuit 3*a* according to a variation of Embodiment 3.

Power-supply stabilization circuit 3*a* according to the variation of Embodiment 3 is different from power-supply stabilization circuit 3 according to Embodiment 3 in that resistors R13 and R14 are provided. The other points are the same as those of Embodiment 3, and thus will not be described. Also, resistors R13 and R14 are also the same as those in Embodiment 2, and thus will not be described.

Power-supply stabilization circuit 3*a* is capable of operating to follow variations in the constant-voltage signal. Power-supply stabilization circuit 3*a* is further capable of detecting an error in transistors Tr1 and Tr2 at the stage of power amplification in node N6 that is located in the middle of high-resistive resistors R13 and R14.

Note that in Embodiment 3 and its variation, the noise component extractor (e.g., capacitor C1) may be provided as in the case of Variation 2 of Embodiment 1.

In Embodiment 3 and its variation, constant-voltage power supply 200 may be connected to input terminal t1 instead of constant-voltage power supply 100, terminal t3 may be connected to the ground, and terminals t4 may be connected to a voltage step-down circuit that steps down the voltage of the constant-voltage signal outputted from constant-voltage power supply 200 and outputs the resulting signal.

As described above, power-supply stabilization circuit 3, 3*a* is a power-supply stabilization circuit that stabilizes a constant-voltage signal outputted from constant-voltage power supply 100, 200 and including a noise component, and outputs the constant-voltage signal that has been stabilized from output terminal t2. Power-supply stabilization circuit 3, 3*a* includes: transistor Tr1 that is disposed in path L2 that connects path L1 and terminal t4, path L1 connecting constant-voltage power supply 100, 200 and output terminal t2, terminal t4 having a constant voltage at a voltage level lower than a voltage level of a voltage of the constant-voltage signal outputted from constant-voltage power supply 100, 200; resistor R1 that is connected between transistor Tr1 and terminal t4; transistor Tr2 that is disposed in path L3 that connects path L1 and terminal t3 having a constant voltage at a voltage level higher than the voltage level of the voltage of the constant-voltage signal outputted from constant-voltage power supply 100, 200; resistor R2 that is connected between transistor Tr2 and terminal t3; LPF 80; differential amplifier 10 that includes a positive input terminal to which an output signal of LPF 80 is inputted and a negative input terminal which is connected to path L1; reference voltage generator 70 that is disposed in path L8 and generates a second reference voltage from the voltage of the constant-voltage signal, path L8 connecting path L1 and terminal t4 and different from path L2; and DC servo controller 60 that includes a positive input terminal to which the second reference voltage is inputted and a negative input terminal. Here, differential amplifier 10 performs inverting amplification on a difference between the voltage of the constant-voltage signal and an output signal of LPF 80, and outputs a first difference signal obtained by the inverting amplification to the negative input terminal of DC servo controller 60, transistor Tr1, and transistor Tr2. DC servo controller 60 performs inverting amplification on a difference between the second reference voltage and the first difference signal, and outputs a second difference signal obtained by the inverting amplification to LPF 80. Power-supply stabilization circuit 3, 3*a* performs push-pull operations to cause an electric current that is responsive to the first difference signal to flow into terminal t4 from path L1 via transistor Tr1 and resistor R1, when the voltage of the first difference signal is higher than the second reference voltage, and cause an electric current that is responsive to the first difference signal to flow into path L1 from terminal t3 via resistor R2 and transistor Tr2, when the voltage of the first difference signal is lower than the second reference voltage.

With this, it is possible to further stabilize an output of constant-voltage power supplies 100 and 200 in Embodiment 3 and its variation, as with Embodiment 1 and its variations.

Also, DC servo controller 60 enables differential amplifier 10 to operate in a manner that the reference voltage for differential amplifier 10 follows variations in the constant-voltage signals of constant-voltage power supplies 100 and 200. At the same time, DC servo controller 60 also compensates for DC offsets of differential amplifier 10.

Also, since transistors Tr3 and Tr4 are not used, it is possible to reduce the number of transistors that need to be thermal-boded. More specifically, in Embodiment 1 and its variations, transistors Tr1 and Tr3, and diode D1 need to be thermal-bonded. In Embodiment 3 and its variation, however, only transistor Tr1 and diode D1 need to be thermal-bonded. Similarly, in Embodiment 1 and its variations, transistors Tr2 and Tr4, and diode D2 need to be thermal-bonded. In Embodiment 3 and its variation, however, only transistor Tr2 and diode D2 need to be thermal-bonded.

For example, second reference voltage generator 70 is a voltage-dividing circuit that divides the voltage of the constant-voltage signal to generate the second reference voltage.

With this, it is possible to make a minor adjustment of an output of differential amplifier 10.

Other Embodiments, Etc

The embodiments have been described above to illustrate the technology disclosed in the present application. Note, however, that the technology according to the present disclosure is not limited to them, and thus is applicable to an embodiment obtained by making modifications, replacements, additions, omissions, and so forth, where appropriate. Also, structural elements described in the foregoing embodiments may be combined to serve as a new embodiment.

In the foregoing embodiments, for example, each of the transistors is a bipolar transistor, but the technology of the present disclosure is not limited to this. For example, each of the transistors may also be a transistor capable of controlling an electric current, such as a metal oxide semiconductor field effect transistor (MOSFET).

In the foregoing embodiments, for example, terminal t4 is described as an example of the first constant-voltage portion, but the first constant voltage portion is not limited to a terminal. The first constant voltage portion may thus be, for example, a wire on a board. The first constant voltage portion may be, for example, a wire connected to the ground in Embodiments 1 and 2, and may be, for example, a wire connected to a voltage step-down circuit in Variation 3 of Embodiment 1.

In the foregoing embodiments, for example, terminal t3 is described as an example of the second constant voltage portion, but the second constant voltage portion is not limited to a terminal. The second constant voltage portion may thus be, for example, a wire on a board. The second constant-voltage portion may be, for example, a wire connected to a voltage-boosting circuit in Embodiments 1 and 2, and may be, for example, a wire connected to the ground in Variation 3 of Embodiment 1.

The embodiments have been described above to illustrate the technology according to the present disclosure, for which the accompanying drawings and detailed description have been provided.

The structural elements described in the accompanying drawings and detailed description can thus include not only the structural elements that are essential to solve the problem, but also optional structural elements that are not essential to solve the problem. Therefore, the fact that such optional structural elements are illustrated in the accompanying drawings and detailed description should not lead to the immediate conclusion that these optional structural elements are essential.

Also note that the foregoing embodiments are intended for illustrating the technology according to the present disclosure, and thus allow for various modifications, replacements, additions, omissions, and so forth made thereto within the scope of the claims and its equivalent scope.

INDUSTRIAL APPLICABILITY

The present disclosure is applicable to a device that requires a stabilized constant-voltage power supply. More specifically, the present disclosure is applicable to a device for sound reproduction, such as an audio device, a television, a personal computer (PC), a mobile device, etc.

REFERENCE SIGNS LIST

1, 1*a*, 1*b*, 1*c*, 2, 3, 3*a* power-supply stabilization circuit
10 differential amplifier 20, 40, 80 LPF
30, 50, 70 reference voltage generator
60 DC servo controller
100, 200 constant-voltage power supply
110 load
C1 capacitor
D1, D2 diode
L1, L2, L3, L4, L5, L6, L7, L8 path
N1, N2, N3, N4, N5, N6 node
R1, R2, R3, R4, R5, R6, R7, R8, R9, R10, R11, R12, R13, R14, R15, R16 resistor
Tr1, Tr2, Tr3, Tr4 transistor
t1 input terminal
t2 output terminal
t3, t4 terminal

The invention claimed is:

1. A power-supply stabilization circuit that stabilizes a constant-voltage signal outputted from a constant-voltage power supply and including a noise component, and outputs the constant-voltage signal that has been stabilized from an output terminal, the power-supply stabilization circuit comprising:

a first transistor that is disposed in a second path that connects a first path and a first constant-voltage portion, the first path connecting the constant-voltage power supply and the output terminal, the first constant-voltage portion having a constant voltage at a voltage level lower than a voltage level of a voltage of the constant-voltage signal outputted from the constant-voltage power supply;

a first shunt resistor that is connected between the first transistor and the first constant-voltage portion;

a second transistor that is disposed in a third path that connects the first path and a second constant-voltage portion having a constant voltage at a voltage level higher than the voltage level of the voltage of the constant-voltage signal outputted from the constant-voltage power supply;

a second shunt resistor that is connected between the second transistor and the second constant-voltage portion;

a third transistor that is disposed in a fourth path and current mirror-connected to the first transistor, the fourth path connecting the first constant-voltage portion and the second constant-voltage portion and different from the second path and the third path;

a fourth transistor that is disposed between the second constant-voltage portion and the third transistor in the fourth path, and current mirror-connected to the second transistor;

a differential amplifier that includes a first positive input terminal to which a first reference voltage is inputted and a first negative input terminal which is connected to the first path; and a first low-pass filter that is connected between a fifth path and a node, in the fourth path, that is present between the third transistor and the fourth transistor, the fifth path connecting the first path and the first negative input terminal, wherein an added signal is inputted to the first negative input terminal, the added signal being obtained by adding the constant-voltage signal and an output signal of the first low-pass filter, the differential amplifier performs inverting amplification on a difference between a voltage of the added signal and the first reference voltage, and outputs a first difference signal obtained by the inverting amplification to the first transistor and the second transistor, and the power-supply stabilization circuit performs push-pull operations to cause an electric current that is responsive to the first difference signal to flow into the first constant-voltage portion from the first path via the first transistor and the first shunt resistor, when the voltage of the added signal is higher than the first reference voltage, and cause an electric current that is responsive to the first difference signal to flow into the first path from the second constant-voltage portion via the second shunt resistor and the second transistor, when the voltage of the added signal is lower than the first reference voltage.

2. The power-supply stabilization circuit according to claim 1, further comprising:

a first reference voltage generator that generates the first reference voltage.

3. The power-supply stabilization circuit according to claim 1, further comprising:

a second low-pass filter that is disposed in a path that connects the first path and the first positive input terminal, wherein the first reference voltage is a voltage of an output signal of the second low-pass filter.

4. The power-supply stabilization circuit according to claim 1, further comprising:

a noise component extractor that is disposed between the first path and a node, in the fifth path, to which the first low-pass filter is connected.

5. The power-supply stabilization circuit according to claim 1, wherein the voltage of the constant-voltage signal is a positive voltage, and the voltage level of the first constant-voltage portion is a ground level.

6. The power-supply stabilization circuit according to claim 1, wherein the voltage of the constant-voltage signal is a negative voltage, and the voltage level of the second constant-voltage portion is a ground level.

7. A power-supply stabilization circuit that stabilizes a constant-voltage signal outputted from a constant-voltage power supply and including a noise component, and outputs the constant-voltage signal that has been stabilized from an output terminal, the power-supply stabilization circuit comprising:

a first transistor that is disposed in a second path that connects a first path and a first constant-voltage portion, the first path connecting the constant-voltage power supply and the output terminal, the first constant-voltage portion having a constant voltage at a voltage level lower than a voltage level of a voltage of the constant-voltage signal outputted from the constant-voltage power supply;

a first shunt resistor that is connected between the first transistor and the first constant-voltage portion;

a second transistor that is disposed in a third path that connects the first path and a second constant-voltage portion having a constant voltage at a voltage level higher than the voltage level of the voltage of the constant-voltage signal outputted from the constant-voltage power supply;

a second shunt resistor that is connected between the second transistor and the second constant-voltage portion;

a first voltage sensing resistor that is disposed in a sixth path that connects the first transistor and the second transistor and is different from the second path and the third path;

a second voltage sensing resistor that is disposed in the sixth path, between the second transistor and the first sensing resistor;

a differential amplifier that includes a first positive input terminal to which a first reference voltage is inputted and a first negative input terminal which is connected to the first path; and a first low-pass filter that is connected between a fifth path and a node, in the sixth path, that is present between the first voltage sensing resistor and the second voltage sensing resistor, the fifth path connecting the first path and the first negative input terminal, wherein an added signal is inputted to the first negative input terminal, the added signal being obtained by adding the constant-voltage signal and an output signal of the first low-pass filter, the differential amplifier performs inverting amplification on a difference between a voltage of the added signal and the first reference voltage, and outputs a first difference signal obtained by the inverting amplification to the first transistor and the second transistor, and the power-supply stabilization circuit performs push-pull operations to cause an electric current that is responsive to the first difference signal to flow into the first constant-voltage portion from the first path via the first transistor and the first shunt resistor, when the voltage of the added signal is higher than the first reference voltage, and cause an electric current that is responsive to the first difference signal to flow into the first path from the second constant-voltage portion via the second shunt resistor and the second transistor, when the voltage of the added signal is lower than the first reference voltage.

8. A power-supply stabilization circuit that stabilizes a constant-voltage signal outputted from a constant-voltage power supply and including a noise component, and outputs the constant-voltage signal that has been stabilized from an output terminal, the power-supply stabilization circuit comprising:

a first transistor that is disposed in a second path that connects a first path and a first constant-voltage portion, the first path connecting the constant-voltage power supply and the output terminal, the first constant-voltage portion having a constant voltage at a voltage level lower than a voltage level of a voltage of the constant-voltage signal outputted from the constant-voltage power supply;

a first shunt resistor that is connected between the first transistor and the first constant-voltage portion;

a second transistor that is disposed in a third path that connects the first path and a second constant-voltage portion having a constant voltage at a voltage level higher than the voltage level of the voltage of the constant-voltage signal outputted from the constant-voltage power supply;

a second shunt resistor that is connected between the second transistor and the second constant-voltage portion;

a third low-pass filter;

a differential amplifier that includes a first positive input terminal to which an output signal of the third low-pas filter is inputted and a first negative input terminal which is connected to the first path;

a second reference voltage generator that is disposed in a seventh path and generates a second reference voltage from the voltage of the constant-voltage signal, the seventh path connecting the first path and the first constant-voltage portion and different from the second path; and a DC servo controller that includes a second positive input terminal to which the second reference voltage is inputted and a second negative input terminal, wherein the differential amplifier performs inverting amplification on a difference between the voltage of the constant-voltage signal and an output signal of the third low-pass filter, and outputs a first difference signal obtained by the inverting amplification to the second negative input terminal, the first transistor, and the second transistor, the DC servo controller performs inverting amplification on a difference between the second reference voltage and the first difference signal, and outputs a second difference signal obtained by the inverting amplification to the third low-pass filter, the power-supply stabilization circuit performs push-pull operations to cause an electric current that is responsive to the first difference signal to flow into the first constant-voltage portion from the first path via the first transistor and the first shunt resistor, when the voltage of the first difference signal is higher than the second reference voltage, and cause an electric current that is responsive to the first difference signal to flow into the first path from the second constant-voltage portion via the second shunt resistor and the second transistor, when the voltage of the first difference signal is lower than the second reference voltage.

9. The power-supply stabilization circuit according to claim 8, wherein the second reference voltage generator is a voltage-dividing circuit that divides the voltage of the constant-voltage signal to generate the second reference voltage.

* * * * *